United States Patent
Wu

(10) Patent No.: US 10,834,392 B2
(45) Date of Patent: Nov. 10, 2020

(54) METHOD OF SENSOR-ASSISTED RATE CONTROL

(71) Applicant: SZ DJI TECHNOLOGY CO., LTD, Shenzhen (CN)

(72) Inventor: Yannan Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 129 days.

(21) Appl. No.: 15/451,999

(22) Filed: Mar. 7, 2017

(65) Prior Publication Data

US 2017/0180729 A1    Jun. 22, 2017

Related U.S. Application Data

(63) Continuation of application No. PCT/CN2015/085759, filed on Jul. 31, 2015.

(51) Int. Cl.
| | |
|---|---|
| *H04N 19/115* | (2014.01) |
| *H04N 19/172* | (2014.01) |
| *H04N 19/124* | (2014.01) |
| *H04N 19/137* | (2014.01) |
| *H04N 19/503* | (2014.01) |
| *H04N 19/51* | (2014.01) |
| *B64C 39/02* | (2006.01) |

(52) U.S. Cl.
CPC ......... *H04N 19/115* (2014.11); *H04N 19/124* (2014.11); *H04N 19/137* (2014.11); *H04N 19/172* (2014.11); *H04N 19/503* (2014.11); *H04N 19/51* (2014.11); *B64C 39/024* (2013.01); *B64C 2201/127* (2013.01)

(58) Field of Classification Search
CPC .. H04N 19/115; H04N 19/137; H04N 19/503; H04N 19/51; H04N 19/172; H04N 19/124; B64C 39/024; B64C 2201/127
USPC .................................................... 375/240.16
See application file for complete search history.

(56) References Cited

U.S. PATENT DOCUMENTS

| | | | | |
|---|---|---|---|---|
| 5,241,401 | A | * 8/1993 | Fujiwara ............. | H04N 19/176 348/390.1 |
| 6,192,075 | B1 | * 2/2001 | Jeng .................... | H04N 19/159 375/240 |
| 6,501,800 | B1 | * 12/2002 | Sawada ................ | H04N 19/105 348/419.1 |

(Continued)

FOREIGN PATENT DOCUMENTS

| CN | 1668107 A | 9/2005 |
|---|---|---|
| CN | 1889687 A | 1/2007 |

(Continued)

OTHER PUBLICATIONS

Angelino, et al. Sensor aided H. 264 video encoder for uav applications. Picture Coding Symposium (PCS), 2013. IEEE, 2013.

(Continued)

*Primary Examiner* — Tung T Vo
(74) *Attorney, Agent, or Firm* — Anova Law Group, PLLC

(57) ABSTRACT

Methods and systems of determining a quantization step for encoding video based on motion data are provided. Video captured by an image capture device is received. The video comprises a video frame component. Additionally, motion data associated with the video frame component is received. Further, a quantization step for encoding the video frame component is determined based on the motion data.

17 Claims, 21 Drawing Sheets

(56) References Cited

U.S. PATENT DOCUMENTS

| | | | |
|---|---|---|---|
| 6,741,282 B1 | 5/2004 | Morris | |
| 7,733,380 B1* | 6/2010 | Cote | H04N 5/23212 348/220.1 |
| 8,031,777 B2 | 10/2011 | Haskell et al. | |
| 8,854,458 B2 | 10/2014 | Fukamachi et al. | |
| 9,171,213 B2 | 10/2015 | Bulan et al. | |
| 10,356,419 B2* | 7/2019 | Miyashita | |
| 2005/0024487 A1* | 2/2005 | Chen | H04N 19/172 348/14.13 |
| 2005/0232503 A1* | 10/2005 | Oishi | H04N 19/159 382/239 |
| 2006/0088191 A1 | 4/2006 | Zhang et al. | |
| 2006/0098740 A1* | 5/2006 | Byun | H04N 5/145 375/240.16 |
| 2006/0222078 A1* | 10/2006 | Raveendran | H04N 21/2365 375/240.16 |
| 2007/0217517 A1 | 9/2007 | Heyward | |
| 2008/0159385 A1 | 7/2008 | Joyce et al. | |
| 2008/0187047 A1* | 8/2008 | Stephan | H04N 19/61 375/240.16 |
| 2008/0198931 A1 | 8/2008 | Chappalli et al. | |
| 2008/0267296 A1 | 10/2008 | Shin et al. | |
| 2009/0092336 A1 | 4/2009 | Tsurumi | |
| 2010/0067741 A1 | 3/2010 | Stolkin et al. | |
| 2010/0079605 A1 | 4/2010 | Wang et al. | |
| 2010/0246680 A1* | 9/2010 | Tian | H04N 19/00569 375/240.16 |
| 2010/0305857 A1* | 12/2010 | Byrne | G06T 7/73 701/301 |
| 2011/0043706 A1 | 2/2011 | Van Beek et al. | |
| 2011/0249959 A1 | 10/2011 | Kim et al. | |
| 2011/0286635 A1 | 11/2011 | Nishigaki | |
| 2011/0292996 A1 | 12/2011 | Jayant et al. | |
| 2011/0298942 A1* | 12/2011 | Uchida | H04N 5/232 348/222.1 |
| 2012/0027258 A1 | 2/2012 | Uchida et al. | |
| 2012/0075535 A1 | 3/2012 | Van et al. | |
| 2012/0197461 A1 | 8/2012 | Barrows et al. | |
| 2012/0207220 A1* | 8/2012 | Kim | H04N 19/46 375/240.16 |
| 2012/0224629 A1* | 9/2012 | Bhagavathy | H04N 19/172 375/240.08 |
| 2012/0294546 A1 | 11/2012 | Sakamoto et al. | |
| 2013/0286205 A1 | 10/2013 | Okada et al. | |
| 2013/0301706 A1 | 11/2013 | Qiu et al. | |
| 2013/0336387 A1 | 12/2013 | Ono et al. | |
| 2014/0023611 A1 | 1/2014 | Lewis et al. | |
| 2014/0029664 A1 | 1/2014 | Au et al. | |
| 2014/0126832 A1* | 5/2014 | Lim | H04N 19/00539 382/233 |
| 2014/0177706 A1 | 6/2014 | Fernandes et al. | |
| 2015/0030208 A1 | 1/2015 | Fragoulis | |
| 2015/0104116 A1 | 4/2015 | Salvador et al. | |
| 2015/0248586 A1 | 9/2015 | Gaidon et al. | |
| 2015/0294178 A1 | 10/2015 | Jung et al. | |
| 2015/0365696 A1 | 12/2015 | Garud et al. | |
| 2016/0080760 A1 | 3/2016 | Nakaishi | |
| 2016/0191946 A1* | 6/2016 | Zhou | H04N 19/523 375/240.16 |
| 2016/0225161 A1 | 8/2016 | Hepper | |
| 2016/0327389 A1* | 11/2016 | Uzunovic | G01C 17/38 |
| 2017/0006340 A1* | 1/2017 | Enke | H04L 65/602 |
| 2017/0180754 A1 | 6/2017 | Wu et al. | |
| 2017/0208341 A1 | 7/2017 | Kulakov et al. | |
| 2018/0288406 A1* | 10/2018 | Kouno | H04N 19/176 |

FOREIGN PATENT DOCUMENTS

| | | |
|---|---|---|
| CN | 101166276 A | 4/2008 |
| CN | 101325711 A | 12/2008 |
| CN | 103347185 A | 10/2013 |
| CN | 103533359 A | 1/2014 |
| CN | 104285433 A | 1/2015 |
| EP | 1921867 A1 | 5/2008 |
| JP | H06233270 A | 8/1994 |
| JP | 2004221757 A | 8/2004 |
| JP | 2005287031 A | 10/2005 |
| JP | 2005323021 A | 11/2005 |
| JP | 2007150458 A | 6/2007 |
| JP | 2008104181 A | 5/2008 |
| JP | 2009212937 A | 9/2009 |
| JP | 2013081101 A | 5/2013 |
| JP | 2014132706 A | 7/2014 |
| JP | 2014192704 A | 10/2014 |
| WO | WO-2013169785 A1 | 11/2013 |
| WO | 2015079470 A2 | 6/2015 |

OTHER PUBLICATIONS

Apostolopoulos. Error-Resilient Video Compression Through the use of Multiple States. Cited as about to appear in ICIP-2000, Vancouver, Canada.

Barron, et al. Systems and Experiment Performance of Optical Flow Techniques. International Journal of Computer Vision, 12 :1, 43-77 (1994).

Belfiore, et al. Concealment of Whole-Frame Losses for Wireless Low Bit-Rate Video Based on Multiframe Optical Flow Estimation. Transactions on Multimedia, vol. 7, No. 2, Apr. 2005; 316-329.

Co-pending U.S. Appl. No. 15/452,680, filed Mar. 7, 2017.

Hoang, et al. Efficient Cost Measures for Motion Estimation at Low Bit Rates. IEEE Transactions on Circuits and Systems for Video Technology, vol. 8, No. 4, Aug. 1998.

International search report and written opinion dated May 10, 2016 for PCT/CN2015/085762.

International search report dated Apr. 22, 2016 for PCT Application No. PCT/CN2015/085759.

Ma, et al. Rate-Distortion Analysis for H.264/AVC Video Coding and its Application to Rate Control. IEEE Transactions on Circuits and Systems for Video Technology, vol. 15, No. 12, Dec. 2005; 1533-1544.

Phantom 3 Professional User Manual V1.0, DJI, May 2015, pp. 1-55 http://download.dji-innovations.com/downloads/phantom_3/jp/Phantom_3_Professional_User_Manual_v1.0_jp.pdf (English Version Included).

* cited by examiner

METHOD OF SENSOR-ASSISTED RATE CONTROL

CROSS-REFERENCE

This application is a continuation application of International Application No. PCT/CN2015/085759, filed Jul. 31, 2015, the contents of which is hereby incorporated by reference in its entirety.

BACKGROUND

Video that is captured, such as video that is captured by unmanned aerial vehicles (UAVs), may be encoded by various methods. However, video encoding methods and systems for UAVs may be less than ideal. For example, packet loss may occur when captured video from a UAV is encoded and transmitted, especially when the video contains a large amount of movement.

Aerial vehicles, such as UAVs, have been developed for a wide range of applications including surveillance, search and rescue operations, exploration, and other fields. Such UAVs may often carry a camera module on-board for video capturing. Video that is captured by UAVs may contain a large amount of movement.

SUMMARY

Maintenance of a constant bitrate (CBR) is an important aspect of modern video encoding technology. A CBR may be maintained when the number of bits that are fed to a decoder remains constant, e.g. within predetermined thresholds, over time. The maintenance of a CBR is important for transmitting data, such as video, over a network. In particular, when bitrate of transmitted data fluctuates, packet loss and/or signal loss may result. The maintenance of a constant bitrate is also important when processing data, such as video, using a coded picture buffer (CPB) on the decoder side of a video encoding process. In particular, when bitrate of data that is being processed fluctuates, the decoder buffer may overflow. As such, controlling bitrate when initially encoding data is an important feat when using an encoding processor.

Accordingly, a need exists for improved methods and systems for encoding video obtained from video capture devices so as to maintain a CBR when the video data is decoded. The video capture devices may be carried by unmanned vehicles, such as unmanned aerial vehicles (UAVs). Methods are provided for encoding video captured by video capture devices, such as video capture devices on UAVs, by utilizing information from sensors associated with the UAV. In some embodiments, the video capture devices may capture video that includes motion data. Additionally, a UAV may use sensors that are associated with the UAV to capture information that may be used to generate an optical flow field. When the captured video is aligned with a correlating optical flow field that is based on sensor information captured at a similar time as the video, the resulting information may be used to efficiently encode the video data. In particular, the aligned video and optical flow field data may be used to efficiently allocate bits and/or choose quantization steps for encoding portions of a video frame component. In particular, systems and methods described herein may be used to identify areas of video frames having a high degree of motion and may allocate more bits and/or utilize a higher quantization step when encoding the portions of video frame components that are associated with a high degree of motion. For example, a higher quantization step may be used to encode a first video frame that is associated with a high degree of motion, and a lesser quantization step may be used to encode a second video frame that is associated with a degree of motion that is not a high degree of motion. A high degree of motion may be determined when the degree of motion within a video frame exceeds a threshold degree of motion. Further, the degree of motion may be assessed based on the degree of movement within a video frame. Additionally, the motion data that is associated with the video frame components may be determined based on an optical flow field that is associated with the video frame components. Accordingly, methods may be directed towards allocating bits and/or selecting quantization steps to encode video data based on information from an optical flow field. In particular, the optical flow field may be aligned with the video data so as to improve the efficiency of a video encoding process.

An optical flow field that is generated using sensor data from a UAV may be used to efficiently encode video data that is aligned with the generated optical flow field. The video data may be encoded by one or more processors at the UAV, video capture device, or carrier on-board the UAV. The video data may be encoded by one or more processors external to the UAV, such as a user terminal that is communicatively connected to the UAV. Additionally, the optical flow field may be generated at the UAV. Alternatively, the optical flow field may be generated at an external location that is communicatively connected to the UAV. The sensor information that is used to generate the optical flow field may be detected at the UAV. Additionally or alternatively, the sensor information that is used to generate the optical flow field may be provided to the UAV from an external source that is communicatively connected to the UAV. Accordingly, video data that is captured by a video capture device may be efficiently encoded using an optical flow field that is generated based on sensor data that is associated with the UAV.

In particular, an optical flow field that corresponds to video data captured by a video capture device may be used to efficiently allocate bits and/or select quantization steps for encoding portions of video data. For example, when encoding video frames, the optical flow field data may be used to determine how many bits should be allocated to encode video data on a frame-by-frame basis. In examples when captured video has very little movement, as determined by an optical flow field associated with the video frame, an encoding processor may choose to allocate fewer bits to encoding the low movement video data on a frame-by-frame basis. Additionally, when portions of a video frame have little movement, as indicated by an optical flow field associated with the video frame, the video encoder may choose to allocate fewer bits to encode those low movement portions of the video frame.

Further, when encoding video data, it is beneficial to break up video data into video frame components and encode recognized similarities between video frame components, rather than encoding each frame over and over again. This approach may be especially beneficial when video frame components, such as blocks, are similar or duplicates across a number of frames (e.g., when driving towards mountains that are far away, the mountains will look relatively the same across a number of video frame components). In particular, blocks that are similar or duplicates may be encoded based the differences, or residue, between the blocks. This residue may require significantly fewer bits than re-encoding each similar or duplicate block.

However, as some video data may have a great deal of movement, it is sometimes difficult to associate blocks between video frames, even when there may be a great amount of similarity between at least some blocks of the two video frames. This is because, with great movement, the bias of the similar elements within a video frame may be shifted across a video frame. For example, as a camera shifts right, objects of the video that were formerly at the right edge of a video frame will be shifted to the left. However, conventional methods of encoding video data are based on the assumption that blocks at a particular location on a first video frame are associated with blocks at the same particular location on a second video frame. In these examples, the optical flow field data may be used to reassess an algorithm that is used in balance the rate-distribution optimization (RDO). In particular, the optical flow field data that is associated with the video data may be used by an encoding processor to focus more bit allocation on encoding coefficients between video frame components. Alternatively, the optical flow field data that is associated with the video data may be used by an encoding processor to focus more bit allocating on searching for motion vectors within video frame components.

Based on this shortcoming of conventional methods of encoding video data, aspects of the invention provide the use of optical flow field data to contextualize video data. In particular, an optical flow field that is aligned with the video data may be used by an encoding processor to allocate bits and/or select quantization steps for the encoding of video frame components.

An aspect of the invention may include a method of determining a quantization step for encoding video based on motion data. The method may include receiving video captured by an image capture device, the video comprising a video frame component. The method may also include receiving motion data associated with the video frame component. Additionally, the method may include determining a quantization step for encoding the video frame component based on the motion data.

In some embodiments, an aspect of the invention may include non-transitory computer readable medium containing program instructions for determining a quantization step for encoding video based on motion data. The computer readable medium may include program instructions for receiving video captured by an image capture device, the video comprising a video frame component. Additionally, the computer readable medium may include program instructions for receiving motion data associated with the video frame component. The computer readable medium may also include program instructions for determining a quantization step for encoding the video frame component based on the motion data.

Aspects of the invention may further include a system for determining a quantization step for encoding video based on motion data. The system may include an image capture device configured to capture a video. The system may also include one or more processors, individually or collectively configured to receive the video captured by the image capture device, the video comprising a video frame component. The one or more processors may also be configured to receive motion data associated with the video frame component. Additionally, the one or more processors may be configured to determine a quantization step for encoding the video frame component based on the motion data.

In some other embodiments, aspects of the invention may include a method of determining a quantization step for encoding video based on motion data. The method may include receiving video captured by an image capture device, the video comprising a first video frame component and a second video frame component. Additionally, the method may include receiving motion data associated with the second video frame component. The method may also include determining a quantization step for encoding the first video frame component based on the motion data associated with the second video frame component.

Aspects of the invention may also include a non-transitory computer readable medium containing program instructions for determining a quantization step for encoding video based on motion data. The non-transitory computer readable medium may include program instructions for receiving video captured by an image capture device, the video comprising a first video frame component and a second video frame component. The non-transitory computer readable medium may also include program instructions for receiving motion data associated with the second video frame component. Additionally, the non-transitory computer readable medium may include program instructions for determining a quantization step for encoding the first video frame component based on the motion data associated with the second video frame component.

Further aspects of the invention may include a system for determining a quantization step for encoding video based on motion data. The system may include an image capture device configured to capture a video. The system may also include one or more processors, individually or collectively configured to receive video captured by an image capture device, the video comprising a first video frame component and a second video frame component. The one or more processors may also be configured to receive motion data associated with the second video frame component. Additionally, the one or more processors may be configured to determine a quantization step for encoding the first video frame component based on the motion data associated with the second video frame component.

Another aspect of the invention may include a method of bit allocation for encoding video based on motion data. The method may include receiving video captured by an image capture device, the video comprising a video frame component. Additionally, the method may include receiving motion data associated with the video frame component. The method may also include allocating bits associated with encoding the video frame component based on the motion data.

Additional aspects of the invention may include a non-transitory computer readable medium containing program instructions for bit allocation for encoding video based on motion data. The non-transitory computer readable medium may include program instructions for receiving video captured by an image capture device, the video comprising a video frame component. The non-transitory computer readable medium may also include program instructions for receiving motion data associated with the video frame component. Additionally, the non-transitory computer readable medium may include program instructions for allocating bits associated with encoding the video frame component based on the motion data.

Aspects of the invention may also include a system for bit allocation for encoding video based on motion data. The system may include an image capture device configured to capture a video. Additionally, the system may include one or more processors configured to receive video captured by an image capture device, the video comprising a video frame component. The one or more processors may also be configured to receive motion data associated with the video frame component. Additionally, the one or more processors may be configured to allocate bits associated with encoding the video frame component based on the motion data.

Further, additional aspects of the invention may include a method of bit allocation for encoding video based on motion data. The method may include receiving video captured by an image capture device, the video comprising a first video frame component and a second video frame component. The method may also include receiving motion data associated with the second video frame component. Additionally, the method may include allocating bits associated with encoding the first video frame component based on the motion data associated with the second video frame component.

Aspects of the invention may also include a non-transitory computer readable medium containing program instructions for bit allocation for encoding video based on motion data. The non-transitory computer readable medium may include program instructions for receiving video captured by an image capture device, the video comprising a first video frame component and a second video frame component. Additionally, the non-transitory computer readable medium may include program instructions for receiving motion data associated with the second video frame component. The non-transitory computer readable medium may also include program instructions for allocating bits associated with encoding the first video frame component based on the motion data associated with the second video frame component.

Additionally, aspects of the invention may include a system for bit allocation for encoding video based on motion data. The system may include an image capture device configured to capture a video. The system may also include one or more processors configured to receive video captured by an image capture device, the video comprising a first video frame component and a second video frame component. Additionally, the one or more processors may be configured to receive motion data associated with the second video frame component. The one or more processors may also be configured to allocate bits associated with encoding the first video frame component based on the motion data associated with the second video frame component.

It shall be understood that different aspects of the invention may be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of encoding video while a video capture device is capturing video data of aerial motion (e.g., flight) may also be applied in the context of encoding video while a video capture device is capturing video data of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

The methods, devices and terminals described herein provide effective approaches for efficiently encoding video captured by video capture devices such as UAVs. The methods, devices and terminals described herein can be used to capture video data, generate an optical flow field based on sensor data associated with the UAV, and determine quantization steps and/or bit allocation for encoding the video data based on the generated optical flow field. The methods, devices and terminals disclosed herein can be applied to any suitable movable object or stationery objects. A movable object may be capable of self-propelled movement (e.g., a vehicle), while a stationary object may not be capable of self-propelled movement. In some embodiments, the movable object may be an unmanned aerial vehicle (UAV).

In addition to providing methods that may be used to efficiently encode video data, methods are provided for encoding data so as to maintain a constant bitrate (CBR) when the video is decoded. In this way, video data that is encoded may be transmitted and processed in a way that provides the decoded video seamlessly to a user. Additionally, when video data is more efficiently encoded, a larger amount of video data may be recorded given a set amount of storage space. Alternatively, video that has increased capacity may be recorded within the same amount of storage space that previously would only be able to record the same amount of general video data. These aspects are beneficial in recording high-definition video, in recording video having a high degree of movement, and in providing video while maintaining a CBR.

The way methods of the invention are able to efficiently encode video data, and maintain a CBR of decoded video, by efficiently allocating an amount of bits towards encoding video frame components. In particular, portions of video that have a high degree of movement may be encoded using more bits than portions of video that have less movement. Additionally, if there are not enough bits to allocate towards encoding portions of video, the compression of the video may be modified. In examples, an increased quantization step may be chosen when encoding portions of a video frame so as to compress the video and use fewer bits when encoding the video. This, in turn, helps to maintain the amount of bits that are allocated for encoding the video so as to maintain a constant bitrate. In particular, when bitrate of data that is being processed fluctuates, the decoder buffer may overflow when decoding the video. As such, controlling bitrate when initially encoding data is an important consideration when using an encoding processor.

Figure 1:
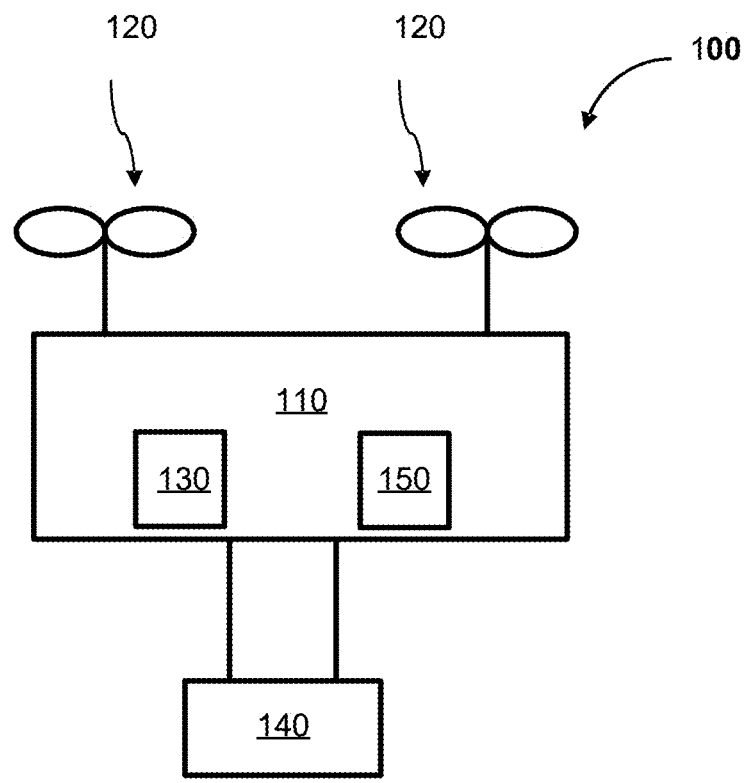
FIG. 1 shows a schematic view of an unmanned aerial vehicle (UAV) carrying a video capture device that is used to capture video, in accordance with embodiments of the invention.

FIG. 1 shows a schematic view of an unmanned aerial vehicle (UAV) 100 carrying a video capture device 140 that is used to capture video in accordance with embodiments of the invention. The UAV may have a UAV body 110 and one or more propulsion units 120 that may effect movement of the UAV. The UAV may have one or more sensors. The one or more sensors may be used to gather data that is used by the UAV to generate an optical flow field. The UAV may optionally have an on-board optical flow field generator 130. The optical flow field that is generated by the UAV may, in turn, be used to efficiently encode video that is captured by the UAV. An encoding processor 150 may optionally be carried by the UAV and used to encode the video.

Video may be captured using a video capture device 140. The video capture device may be supported on a stationary object or a movable object, such as a UAV. Any description herein of a UAV may include any support structure for the video capture device. Any description herein of a UAV 100 may apply to any type of movable object, such as an aerial vehicle. The description of a UAV may apply to any type of unmanned movable object (e.g., which may traverse the air, land, water, or space). The UAV may be capable of responding to commands from a remote controller. The remote controller may be not connected to the UAV, the remote controller may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters. In some embodiments, any description herein of a UAV may apply to any stationary object, such as a support for the video capture device (e.g., stand, pole, fence, building, wall, ceiling, roof, floor, ground, furniture, lighting fixture, tree, plant, stone, or any other stationary object).

The video capture device may be capable of altering a field of view (FOV) captured by the video capture device. The video capture device may have translational motion (e.g., side to side, front to back, up and down, or any combination thereof) to alter the video capture device FOV. The video capture device may have rotational movement (e.g., about a yaw, pitch, or roll axis of the video capture device) to alter the video capture device FOV. In some instances, the video capture device may only have translational motion without rotational motion, may only have rotational motion without translational motion, or may have both translational and rotational motion. Motion captured by video from the video capture device may be indicative of change of the video capture device FOV. The video encoding systems and methods may be used to encode the video captured by the video capture device, as described in greater detail elsewhere herein.

The video capture device may optionally be supported by a UAV 100 or any other support structure. The UAV may have a body 110. In some instances, the body may be a central body which may have one or more branching members, or "arms." The arms may extend outward from the body in a radial manner and be joined via the body. The number of arms may match the number of propulsion units, or rotors, of the UAV. The body may comprise a housing. The housing may enclose one or more components of the UAV within the housing. In some instances, one or more electrical components of the UAV may be provided within the housing. For example, a flight controller of the UAV may be provided within the housing. The flight controller may control operation of one or more propulsion units 120 of the UAV. The propulsion units may each include the rotors and/or motors. Additionally, the one or more propulsion units may permit the UAV to move about in the air. The one or more propulsion units may be provided on an arm of the UAV. The arm may be connected to a body of the UAV on a proximal end of the arm. One or more propulsion units may be connected to a distal end of the arm. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality of rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV shown may have a plurality of rotors. The rotors may connect to the body of the UAV which may comprise a control unit, one or more sensors, a processor, and a power source. The sensors may include vision sensors and/or other sensors that may collect information about the UAV environment. The information from the sensors may be used to determine a location of the UAV. The rotors may be connected to the body via one or more arms or extensions that may branch from a central portion of the body. For example, one or more arms may extend radially from a central body of the UAV, and may have rotors at or near the ends of the arms.

A vertical position and/or velocity of the UAV may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, the output provided to the propulsion units may be increased from its previous landed state. When the UAV is landing, the output provided to the propulsion units may be decreased from its previous flight state. The UAV may be configured to take off and/or land in a substantially vertical manner.

A lateral position and/or velocity of the UAV may be controlled by maintaining and/or adjusting output to one or more propulsion units of the UAV. The altitude of the UAV and the speed of rotation of one or more rotors of the UAV may affect the lateral movement of the UAV. For example, the UAV may be tilted in a particular direction to move in that direction and the speed of the rotors of the UAV may affect the speed of the lateral movement and/or trajectory of movement. Lateral position and/or velocity of the UAV may be controlled by varying or maintaining the speed of rotation of one or more rotors of the UAV.

The arms of the UAV may be tubes or rods. The arms of the UAV may have a circular cross section. The arms of the UAV may have a square or rectangular cross section. The arms of the UAV may have an elliptic cross section. The arms of the UAV may be hollow tubes. The arms of the UAV may be solid tubes. The arms of the UAV may be formed from a metallic, plastic, or composite material. The arms of the UAV may be formed from a lightweight material. The arms of the UAV may be formed from carbon fiber. The arms of the UAV may be integrally formed with the central body of the UAV. Alternatively, the arms of the UAV may be separately formed or may be separable from the UAV.

The UAV may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein. The UAV may be lightweight UAV. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

The UAV may carry the video capture device 140. The video capture device may be supported by any support structure, moving (e.g., UAV) or stationary. In some embodiments, the video capture device may be a camera. Any description herein of a camera may apply to any type of video capture device. The camera may be rigidly coupled to the support structure. Alternatively, the camera may be permitted to move relative to the support structure with respect to up to six degrees of freedom. The camera may be directly mounted onto the support structure, or coupled to a carrier mounted onto the support structure. In some embodiments, the carrier may be a gimbal. In some embodiments, the camera may be an element of a payload of the support structure, such as a UAV.

The camera may capture images (e.g., dynamic images such as video, or still images such as snapshots) of an environment of the UAV. The camera may continuously capture images (e.g., video). Alternatively, the camera may capture images (e.g., video) at a specified frequency to produce a series of image data (e.g., video data) over time. Any description herein of video may apply to any type of images, such as dynamic or still images, such as a series of images captured over time. Images may be captured at a video rate (e.g., 25, 50, 75, 100, 150, 200, or 250 Hz). In some embodiments, the video may be captured simultaneously with a recording of environment audio.

In some embodiments, the captured video may be stored in a memory on-board the UAV. The memory may be a non-transitory computer readable medium that may include one or more memory units (e.g., removable media or external storage such as a Secure Digital (SD) card, or a random access memory (RAM), or a read only memory (ROM) or a flash memory). Alternatively, the captured video and/or images may be transmitted to a remote terminal. The transmission of captured video and/or images may be implemented over a wireless link, including but not limited to, a radio frequency (RF) link, a Wi-Fi link, a blue tooth link, a 2G link, a 3G link, or a LTE link. The memory may be on the camera carried by the UAV, on a carrier of the UAV, and/or on the UAV itself (e.g., within the UAV body or an arm of the UAV). The memory may or may not be removable or separable from the UAV, carrier, or camera.

The camera may comprise an image sensor and one or more lenses. The one or more lenses may be configured to direct light to the image sensor. An image sensor is a device that converts an optical image into an electronic signal. The image sensor of the camera may be a charge-coupled device (CCD) type, a complementary metal-oxide-semiconductor (CMOS) type, a N-type metal-oxide-semiconductor (NMOS) type, or a back-side illuminated CMOS (BSI-CMOS) type.

The camera may have a focal length or focal length range. A focal length of an optical system may be a measure of how strongly the system converges or diverges light. The focal length that is associated with the camera may influence a resulting optical flow field that is generated using video that is captured by the camera. The focal length of a lens may be the distance over which initially collimated rays are brought to a focus. The camera may have any type of lens, such as a prime lens or a zoom lens. A prime lens may have a fixed focal length and the focal length may encompass a single focal length. A zoom lens may have variable focal lengths and the focal length may encompass a plurality of focal lengths.

The video capture device may have a FOV that may change over time. The field of view (FOV) may be a part of the world that is visible through the camera at a particular position and orientation in space; objects outside the FOV when the picture is taken are not recorded in the video data. It is most often expressed as the angular size of the view cone, as an angle of view. For normal lens, field of view may be calculated as FOV=2 arctan(d/2f), where d is image sensor size, and f is focal length of the lens. For an image sensor having a fixed size, the prime lens may have a fixed FOV and the FOV may encompass a single FOV angle. For an image sensor having a fixed size, the zoom lens may have variable FOV angular range and the FOV angular range may encompass a plurality of FOV angles. The size and/or location of the FOV may change. The FOV of the video capture device may be altered to increase or decrease the size of the FOV (e.g., zooming in or out), and/or to change a centerpoint of the FOV (e.g., moving the video capture device translationally and/or rotationally). Alteration of the FOV may result in motion within the video.

Data from sensors associated with a camera may be used to aid in generating an optical flow field, useful for encoding video data captured by the camera. The sensors associated with the camera may be on-board the camera, the support structure for the camera (e.g., UAV), and/or a carrier that supports the camera on the support structure (e.g., gimbal). Alternatively, the sensors associated with the camera may be remote from the camera, the carrier, and/or the support structure for the camera.

For instance, a support structure of the camera may support one or more sensors. In examples, the support structure may be a UAV. Any description of the sensors of the UAV may apply to any type of support structure for the camera. The UAV may comprise one or more vision sensors such as an image sensor. For example, an image sensor may be a monocular camera, stereo vision camera, radar, sonar, or an infrared camera. The UAV may further comprise other sensors that may be used to determine a location of the UAV, or may be useful for generating optical flow field information, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors. The UAV may have sensor on-board on-board the UAV that collect information directly from an environment without contacting an additional component off-board the UAV for additional information or processing. For example, a sensor that collects data directly in an environment may be a vision or audio sensor.

Alternatively, the UAV may have sensors that are on-board the UAV but contact one or more components off-board the UAV to collect data about an environment. For example, a sensor that contacts a component off-board the UAV to collect data about an environment may be a GPS sensor or another sensor that relies on connection to another device, such as a satellite, tower, router, server, or other external device. Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors may be used, such as one, two, three, four, five, or more sensors. Optionally, the data may be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data.

Any of these sensors may also be provided off-board the UAV. The sensors may be associated with the UAV. For instance, the sensors may detect characteristics of the UAV such as position of the UAV, speed of the UAV, acceleration of the UAV, orientation of the UAV, noise generated by the UAV, light emitted or reflected from the UAV, heat generated by the UAV, or any other characteristic of the UAV. The sensors may collect data that may be used alone or in combination with sensor data from sensors on-board the UAV to generate optical flow field information.

The sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors on-board or off-board the UAV may collect information such as location of the UAV, location of other objects, orientation of the UAV 100, or environmental information. A single sensor may be able to collect a complete set of information in an environment or a group of sensors may work together to collect a complete set of information in an environment. Sensors may be used for mapping of a location, navigation between locations, detection of obstacles, or detection of a target. Additionally, and in accordance with the invention, the sensors may be used to gather data which is used to generate an optical flow field that is used to efficiently encode video data captured by the UAV.

Accordingly, the UAV may also have an optical flow field generator 130. The optical flow field generator may be provided on-board the UAV (e.g., in the UAV body or arm, on the camera, or on the carrier). Alternatively, the optical flow field generated may be provided off-board the UAV (e.g., at a remove server, cloud computing infrastructure, remote terminal, or ground station). The optical flow field generator may have one or more processors that are individually or collectively configured to generate an optical flow field based on sensor data that is associated with the UAV. An optical flow field demonstrates how light flows within video frames. This flow of light indicates how captured objects are moving between video frames. In particular, the optical flow field is able to describe characteristics of how objects that are captured by a video capturing device are moving, including direction and speed of the moving objects. For instance, the video captured within the FOV of the video capturing device may include one or more stationary or movable objects. In examples, the optical flow field may be used to determine speeds or accelerations of objects that are moving in video. The optical flow field may also be used to demonstrate directions of movement of objects that are within the video. Examples of optical flow fields that describe objects moving within a video are described below with respect to FIGS. 5 to 11.

The sensor data that is used to generate the optical flow field may be obtained by the one or more sensors associated with the UAV. Additionally or alternatively, the sensor data may be obtained by an external source, such as an external monitoring system. The external sensor data may be provided to the UAV using a communication channel. Accordingly, the optical flow field may be generated at the UAV. Alternatively, an optical flow field may be generated external to the UAV. In particular, the UAV may provide sensor information that is associated with the UAV to one or more external processors. The one or more external processors may then use the sensor data that is associated with the UAV to generate an optical flow field. Further, the one or more external processors may provide the optical flow field that is generated to the UAV. The optical flow field generator, whether on-board or off-board the UAV, may receive data from sensors associated with the UAV (whether the sensors are on-board, off-board, or any combination thereof), which may be used to generate an optical flow field.

The sensor data may optionally include information about the spatial disposition of the camera (e.g., coordinates, translational position, height, orientation), or movement of the camera (e.g., linear speed, angular speed, linear acceleration, angular acceleration). The sensor data may be able to detect a zoom state of the camera (e.g., focal length, how far zoomed in or out). The sensor data may be useful for calculating how a FOV of the camera may change.

An encoding processor 150 may be provided in accordance with embodiments of the invention. The encoding processor may be used to encode video that is captured by the video capture device. Examples of entropy coding tools include Huffman coding, run-level coding, and arithmetic coding. In examples discussed herein, CAVLC and CABAC may be used in H264.

Additionally, the encoding processor may use an optical flow field that is associated with the video. The optical flow field may be used to efficiently encode the video. The video may comprise video frame components. Video frame components may comprise a video frame. Alternatively, video frame components may comprise portions of a video frame, such as blocks. Blocks may have a shape such as a circle, square, octagon, triangle, or other shapes. Additionally, blocks within a video frame may include more than one shape.

The encoding processor may receive the optical flow field information and use the optical flow field information to encode the video. In examples, the encoding processor may use the optical flow field information to allocate bits for the encoding of video frame components. In particular, the encoding processor may allocate more bits to areas having more movement so as to capture distinctions between video frames in the encoding process. Additionally, the encoding processor may use the optical flow field information to select quantization steps for the encoding of video frame components. In particular, the encoding processor may select higher quantization steps for encoding video frame components that have a high degree of motion. Alternatively, the encoding processor may select lower quantization steps for encoding video frame components that are substantially similar. In examples, the encoding processor may select a low quantization step for encoding video frame components that are essentially identical.

The encoding processor may include one or more processors that may encode the video. The encoding processor may be separate from the optical flow field generator, or may be the within the same component as the optical flow field generator. The encoding processor may include one or more processors that do not overlap with one or more processors of the optical flow field generator. Alternatively, one or more processors of the encoding processor may be the same as one or more processors of the optical flow field generator. In some instances, all processors of the encoding processor may be the same as the processors of the optical flow field generator.

The encoding processor may optionally be provided on-board the UAV. For instance, the encoding processor may be within the UAV body or arm, may be on-board the camera, or may be on-board a carrier supporting the camera. Alternatively, the encoding processor may be provided off-board the UAV. For instance, the encoding processor may be provided at a remote server, cloud computing infrastructure, remote terminal, or ground station. The encoding processor may be provided at a same or different location from the optical flow field generator.

Figure 2:
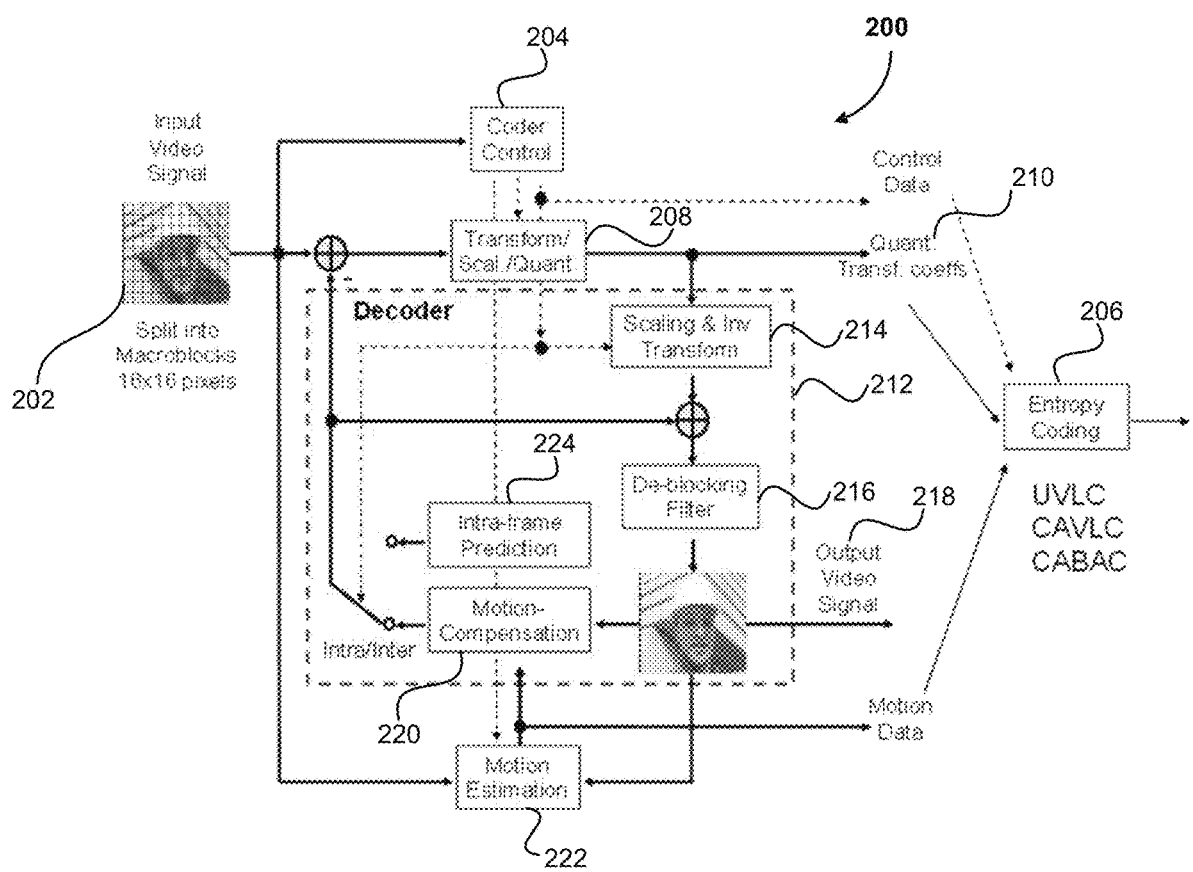
FIG. 2 illustrates a general process of video encoding, in accordance with embodiments of the present invention.

FIG. 2 illustrates a general process 200 of video encoding, in accordance with embodiments of the invention. When encoding video data, video frames of the video data may be initially split into blocks 202. These blocks may then be compressed based on intra frame data and/or inter frame data. Intra fame data is directed towards the spatial relationship between blocks within a frame. Conversely, inter frame data is directed towards the temporal relationship between blocks across video frames. Additionally, the bit consumption of an intra coded frame is more than five times the bit cost by an inter coded frame across temporally related frames when the reconstructed pictures are of the same quality. Additionally, when there is a high degree of motion within video frames, such as video frames that have some objects moving quickly across a series of video frames and other objects moving in and out of the video frames, the bit cost of the inter coding of temporally related frames may significantly increase.

As seen in FIG. 2, an input video signal is received. The input video signal may be received from a video capture device. The video capture device may be supported by a support structure, such as a UAV. Additionally or alternatively, the input video signal may be received from an external device off-board the UAV. The received video may be split into macroblocks 202. Macroblocks may or may not have any overlapping portions. The video may be split into any number of macroblocks. For instance, the video may be split into an array of m×n macroblocks, where m has a value of 1 or more, 2 or more, 3 or more, 4 or more, 5 or more, 6 or more, 7 or more, 8 or more, 9 or more, 10 or more, 12 or more, 15 or more, 16 or more, 18 or more, 20 or more, 25 or more, 30 or more, 40 or more, 50 or more, 60 or more, 70 or more, 80 or more, 90 or more, 100 or more, 120 or more, 150 or more, 200 or more, 250 or more, or 300 or more, and n has a value of 1 or more, 2 or more, 3 or more, 4 or more, 5 or more, 6 or more, 7 or more, 8 or more, 9 or more, 10 or more, 12 or more, 15 or more, 16 or more, 18 or more, 20 or more, 25 or more, 30 or more, 40 or more, 50 or more, 60 or more, 70 or more, 80 or more, 90 or more, 100 or more, 120 or more, 150 or more, 200 or more, 250 or more, or 300 or more. The macroblock may have a rectangular shape, square shape, circular shape, or any other shape. In one embodiment, a macroblock may have a dimension of 16×16 pixels. The macroblock may have any dimension, such as p×q pixels, where where p has a value of 1 or more, 2 or more, 3 or more, 4 or more, 5 or more, 6 or more, 7 or more, 8 or more, 9 or more, 10 or more, 12 or more, 15 or more, 16 or more, 18 or more, 20 or more, 25 or more, 30 or more, 32 or more, 40 or more, 50 or more, 60 or more, 64 or more, 70 or more, 80 or more, 90 or more, 100 or more, 120 or more, 128 or more, 150 or more, 200 or more, 250 or more, 256 or more, or 300 or more, and q has a value of 1 or more, 2 or more, 3 or more, 4 or more, 5 or more, 6 or more, 7 or more, 8 or more, 9 or more, 10 or more, 12 or more, 15 or more, 16 or more, 18 or more, 20 or more, 25 or more, 30 or more, 32 or more, 40 or more, 50 or more, 60 or more, 64 or more, 70 or more, 80 or more, 90 or more, 100 or more, 120 or more, 128 or more, 150 or more, 200 or more, 250 or more, 256 or more, or 300 or more. In the modern video coding standard, a video frame having a resolution of 720P or 1080P may be encoded by first dividing the video frame into small blocks. For H.264, the block size may be 16×16 pixels and for HEVC, the block size may be 64×64. Each macroblock may have the same dimension and/or shape. In examples, a macroblock may be a square, rectangle, circle, triangle, trapezoid, rhombus, oval, or another shape. Alternatively, two or more macroblocks may have differing dimensions and/or shapes. A macroblock may also be referred to as a 'block.'

An encoding processor may be used to remove the correlation of the blocks spatially and/or temporally. As such, after a video frame is divided into small blocks, the blocks of video data may go through a video encoding architecture as provided in FIG. 2.

In particular, the video data may proceed to a coder control 204. The coder control may be used to determine whether to encode the video data directly, e.g. without any additional transformation steps, or whether to send the data to a transformation/scaling/quantization (TSQ) component. In examples, the coder control may pass the video data directly to an entropy coding component 206. In other examples, the coder control may pass the video data to a TSQ component 208 prior to providing the transformed data to the entropy coding component. At the TSQ component, the video data may be transformed so as to compress similarities between spatially and temporally related video frame components, such as blocks. This process may use video from the original input video signal. Additionally, this process may utilize previously encoded video data so as to make the transformation process more efficient. Additionally, this compression process may result in quantization and transformation coefficients 210 which may then be provided to the entropy encoding component. Coefficients may be calculated based on discrete cosine transforms (DCT) and may be used to represent differences between video frame components such as video frames or blocks within a video frame.

When transforming the video data, the video data may be processed in view of previously transformed video data that is re-evaluated at decoder 212 and that is provided as feedback to the TSQ component. In particular, video compression feedback may be generated by providing transformed video data from the TSQ component to scaling and inversion transformation (SIT) component 214. At the SIT component, the transformation process of the video data may be reversed. This video data may then be provided to a de-blocking filter 216 which may be used to generate an output video signal 218. The output video signal may then be used as a component to generate motion compensation factors at motion compensation component 220.

In examples, the motion compensation component may use motion data from an output video signal as well as motion data that is generated from motion estimation component 222. In particular, the motion estimation component may receive input video data from the initial input video signal. The motion estimation component may then generate motion data based on the video data. This motion data may then be provided to the motion compensation component and the entropy coding component.

Once the decoded video data is provided and contextualized based on motion data from the motion compensation component, the video data may be evaluated for intra frame prediction using intra-frame prediction component 224. Additional predictions may also be generated for inter-frame predictions. These predications may be provided as feedback for both the TSQ component as well as the de-blocking filter. As such, the quantization and transformation coefficients that are generated from the TSQ component, as well as the output signal that is generated by the de-blocking filter, may be refined based on feedback from processed video data.

As such, a video encoder may be used to simplify duplicate information, both between blocks of different video frames (temporal compression) as well as between blocks within the same video frame (spatial compression), so as to condense information. Once the video data is condensed, the video frames that are encoded utilizing the architecture in FIG. 2 may be formed into a 1-D bitstream.

Figure 3:
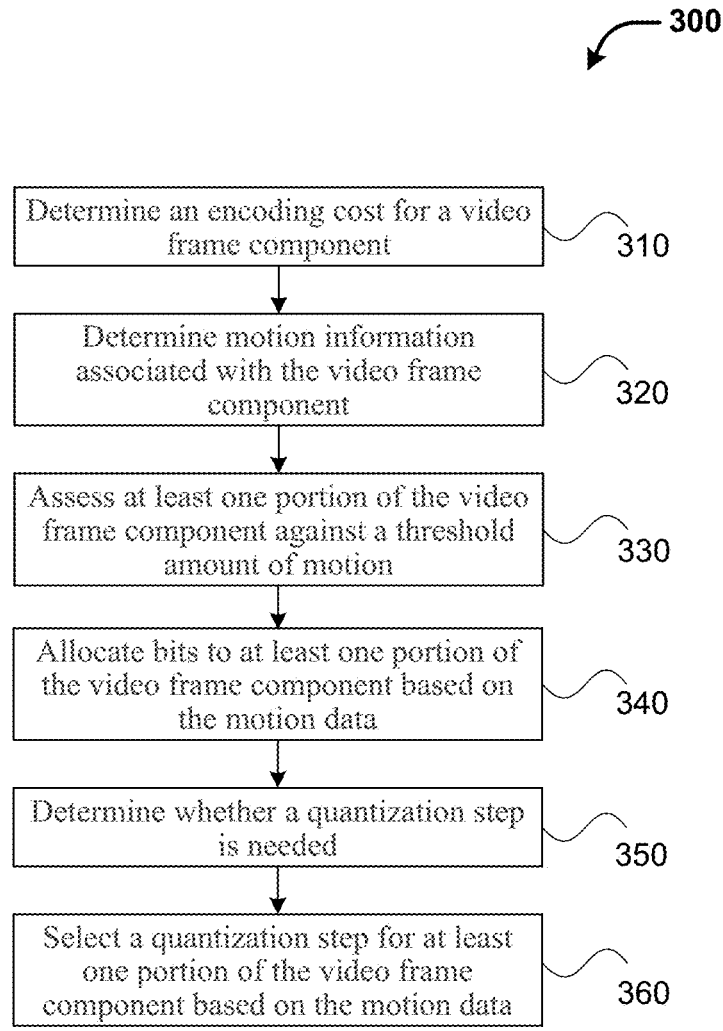
FIG. 3 illustrates a process of determining video data compression based on movement within the video, in accordance with embodiments of the invention.

FIG. 3 illustrates a process 300 of determining video data compression of a video frame component based on movement within the video, in accordance with embodiments of the invention. At step 310, an encoding cost for encoding a video frame component is determined based on an algorithm of a rate distortion optimization. Rate distortion optimization is an optimization of parameters that are modified so as to provide a particular bitrate and distortion of restructured video frames. The rate distortion optimization can be determined using motion information, block size information, and block coefficient information. The encoding cost may be a range of bits that may be allocated to encode a particular video frame component. In particular, the encoding cost is determined by assessing parameters of the rate distortion optimization and determining the bits that may be used for encoding so as to ensure that the bitrate of reconstructed frames is within a CBR. In embodiments discussed herein, an encoding cost may be provided, and methods provided herein may be used to allocate bits and/or select quantization steps so as to efficiently encode video data within the parameters of the provided encoding cost.

At step 320, motion information associated with the video frame component is received. In examples, the motion information may be based on an optical flow field that is associated with the video frame component. The motion information may include motion data that is associated with the video frame component. Additionally, the motion information may include motion data that is associated with video frame components that are adjacent to the video frame component. Additionally, optical flow fields may include motion data that is generated by movement of a video capture device and/or movement of a UAV. Motion data may include translational and/or rotational movement. In examples, motion data may be generated by rotating a video capture device about a roll axis. Motion data may also be generated by rotating a UAV about camera roll axis. In examples, motion data may be generated by moving a video capture device and/or UAV about other axes, such as pitch and yaw. Further, motion data may be generated by moving the video capture device and/or UAV in a sideways, upwards, downwards, zoom-in, zoom-out, or diagonal motion, or a combination thereof. In additional examples, generated optical flow fields may include motion aspects related to the speed of moving objects, distance of moving objects from a video capture device, curving motion of moving objects, directionality of moving objects, and other characteristics of object movement within an optical flow field.

At step 330, at least one portion of the video frame component is assessed against a threshold amount of motion. In examples, a portion of a video frame component that is determined to have more than a threshold amount of motion may be assessed as having a high degree of motion. Additionally, a portion of a video frame component that is determined to have less than a threshold amount of motion may be assessed as having a low degree of motion. Further, a portion of the video frame component that does not have a high degree or low degree of motion may be determined to have a normal degree of motion.

At step 340, bits are allocated to at least one portion of the video frame component based on the motion data. In some instances, this may include allocating the bits based on threshold motion assessments. In particular, a standard bit amount may be allocated to at least one portion of the video frame component that is determined to have a normal degree of motion. Additionally, an augmented bit amount may be allocated to at least one portion of the video frame component that is determined to have a high degree of motion. Further, a lesser bit amount may be allocated to at least one portion of the video frame component that is determined to have a low degree of motion. For instance, a portion of the video frame component having a higher degree of motion may receive a higher bit allocation than a portion of the video frame component having a lower degree of motion. By allocating a higher bit allocation for encoding a portion of the video frame component having a higher degree of motion, the differences between video frames may be more accurately reflected. In particular, video having a high degree of motion may have more objects moving in and out of the video frames than video having a lower degree of motion. As such, more bits may be allocated to encode these differences.

While an augmented bit amount, when available, may be allocated to the at least one portion of the video frame component that is determined to have a high degree of motion, there are examples where a bit amount may be limited. In these examples, an encoding processor may choose to use a quantization step to compress video data. Quantization is a lossy compression technique that is achieved by compressing two or more values to a single quantum value. In image processing, quantization may be especially useful in compressing differences between frequencies of brightness variations that are not easily distinguishable by the human eye. For example, the human eye may be good at perceiving differences of brightness across large frequencies, but may not be able to distinguish varying frequencies that are cumulatively less than a perceptible threshold of difference. Accordingly, video data may be compressed by taking frequencies within the video data that are associated with brightness, dividing the frequencies by a standard value, and then round the resulting calculations of frequency up (or down) to the nearest integer. So long as the variation of frequencies is still beneath the threshold of human perception of differences between frequencies, a user watching the reconstructed video may not even be aware of the distinctions between the original video data and the modified video data. However, the ability to reference a smaller range of frequencies than the range originally captured may allow the video data to be compressed to an amount of bits that is consistent with the encoding cost associated with a CBR for providing reconstructed video.

In addition to choosing to perform a quantization step on data within a video frame component, an encoding processor may also choose a degree of quantization that is used. In particular, the degree of quantization refers to the magnitude of the standard value that is used to divide a set of data, such as the brightness frequencies discussed above. As the standard value that is used to divide data increases, the amount of compression may also be increased. As such, the standard value and the degree of compression may be directly proportional. In examples, the standard value and the degree of compression may be directly linearly proportional.

At step 350, a determination is made as to whether a quantization step is needed to compress the video frame component. This determination may be made based on the provided encoding cost as well as the degree of motion within the video frame component. In particular, if there is a high degree of motion associated with at least one portion of the video frame component, but there are not bits available to allocate to the at least one portion of the video frame component having a high degree of motion, a determination may be made to select a quantization step for that at least on portion of the video frame component. Additionally, the degree of quantization that may be used may be calculated during the determination step 350. In particular, the degree of quantization still may be calculated based on the encoding cost of the video frame component and the amount of data that needs to be reduced so as to ensure the reconfigured frames will be within a CBR.

Additionally, at step 360, a quantization step is determined for a least one portion of the video frame component. In particular, the selected quantization step may be based on the size of the at least one portion of the video frame component. The selected quantization step may also be based on the motion information within the at least one portion of the video frame component. Further, the selected quantization step may be based on the block coefficient information associated with the at least one portion of the video frame component.

Accordingly, video frame components may be encoded so as to stay within the threshold of encoding cost associated with a CBR of reconstructed video. In particular, the video frame components may be encoded by an encoding processor to stay within the encoding costs by using bit allocation and/or quantization step selection. As video frame components may have varying degrees of motion, however, the degree to which an encoding processor uses bit allocation versus quantization step selection may also vary based upon motion within the video frame components. In particular, when encoding video frame components, a particular bit allocation and/or quantization step may be selected to encode the video frame components based on motion within the video frame components. In examples, the particular bit allocation and/or quantization step that is selected may be based on a threshold of encoding cost associated with encoding the video frame components so as to maintain a CBR when the encoded video is decoded.

Figure 4:
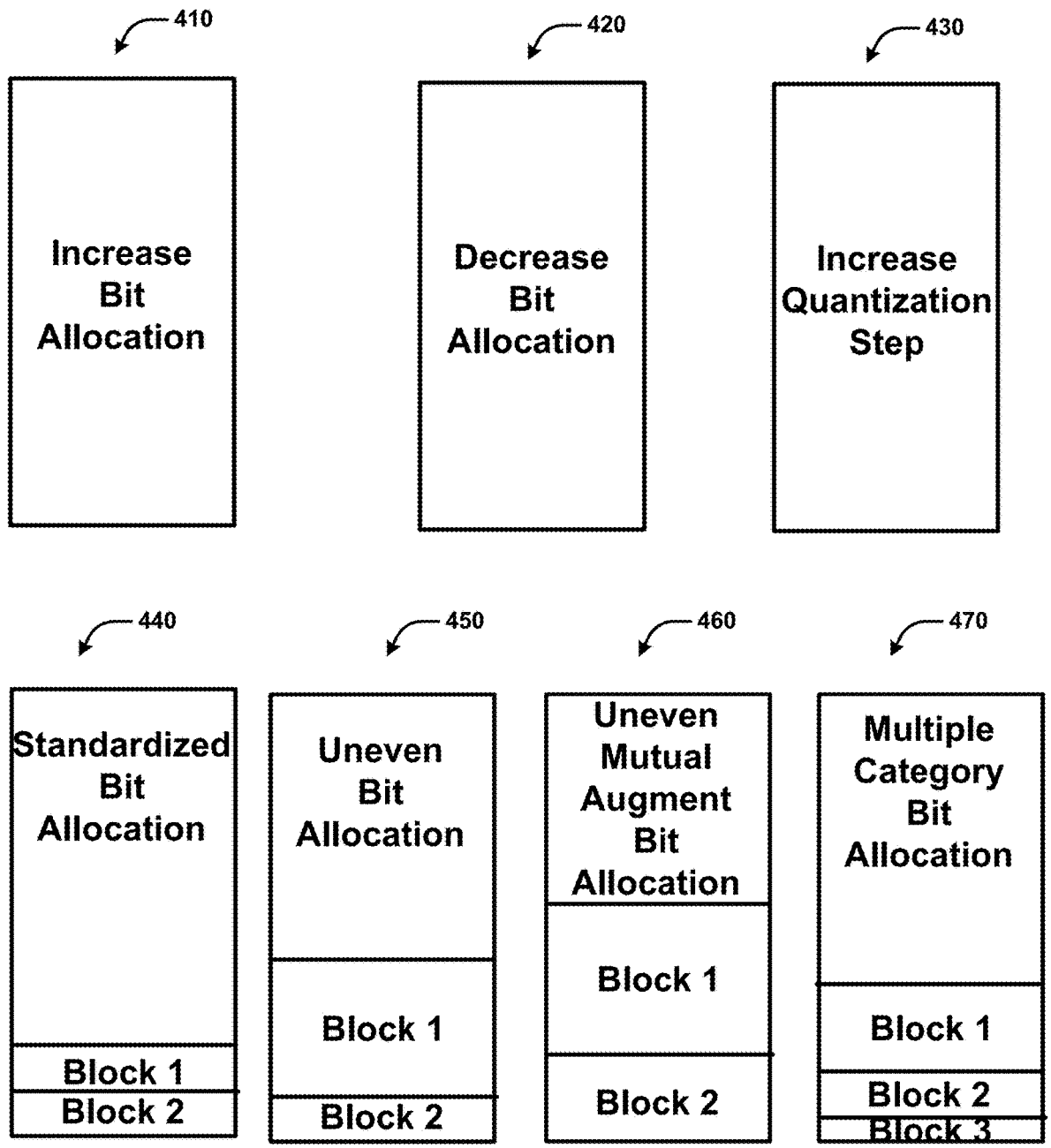
FIG. 4 illustrates schematics of bitrate and quantization step distributions between video frames having different motion components, in accordance with embodiments of the invention.

In order to illustrate this variance across video frame components, FIG. 4 illustrates schematics 400 of bitrate and quantization step distributions between video frame components having different motion components, in accordance with embodiments of the invention. In particular, distributions 410-430 illustrate bit allocation and/or quantization step selection on a frame-by-frame basis and distributions 440-470 illustrate bit allocation and/or quantization step selection on a block-by-block basis.

As seen in FIG. 4, distribution 410 illustrates an increase in bit allocation. Bit allocation may be increased so as to increase the amount of bits that are allocated for encoding a portion of a video frame component. Bits may be increased on a sliding scale based on the amount of movement within a video frame component. Bits may be increased based on categories associated with amounts of bits that are allocated to encoding video frame components. In particular, distribution 410 illustrates an increase in bit allocation across a video frame. Bit allocation may be increased when a video frame includes more than a threshold amount of motion. When more than a threshold amount of motion is present, more bits may be allocated to encode areas having a greater amount of movement so that the movement may be accurately encoded. In particular, an encoding processor may increase bit allocation when a video frame includes portions that have more than a threshold amount of motion. An example of an optical flow field that may be associated with a distribution similar to distribution 410 is provided in FIG. 5.

Additionally, distribution 420 illustrates a decrease in bit allocation. Bit allocation may be decreased so as to decrease the amount of bits that are allocated for encoding a portion of a video frame component. Bits may be decreased on a sliding scale based on the amount of movement within a video frame component. Bits may be decreased based on categories associated with amounts of bits that are allocated to encoding video frame components. In particular, distribution 420 illustrates a decrease in bit allocation across a video frame. Bit allocation may be decreased when a video frame has less than a threshold amount of motion. In particular, in examples where video frames are substantially similar, fewer bits may be needed to accurately represent the differences between the similar frames. An example of an optical flow field that may be associated with a distribution similar to distribution 420 is provided in FIG. 6. Further, distribution 430 illustrates an increase in quantization step. In particular, quantization steps may have different categories of, for example, low, medium, or high quantization. The degree of quantization may be objectively or relatively assessed in view of the different quantization categories. A quantization step may be increased when there is more than a threshold amount of movement in a video frame, and when there are not sufficient bits to allocate to the encoding of the movement in the video frame. As such, an encoding processor may determine areas of a video frame having more than a threshold amount of motion and may assess whether there are sufficient bits to allocate to these areas.

If there are not sufficient bits, the encoding processor may increase a quantization step so as to encode the video while maintaining a CBR when the video data is decoded. In particular, distribution 430 illustrates an increase in quantization step across a video frame. A quantization step may be increased so as to increase the degree of compression of video frame components, thereby decreasing the amount of bits that are used for encoding video frame components. Quantization steps may be increased on a sliding scale based on the amount of movement within a video frame component. Quantization steps may be increased based on categories associated with an amount of movement within encoding video frame components. An example of an optical flow field that may be associated with a distribution similar to distribution 430 is provided in FIG. 7.

While quantization steps may be increased as demonstrated in distribution 430, quantization steps may also be decreased. A quantization step may be decreased so as to decrease the degree of compression of video frame components. It may be beneficial to decrease a quantization step when there are sufficient bits to allocate towards encoding the video frame component. In particular, quantization may be lossy, thereby potentially creating errors when encoding video frame components. Quantization steps may be decreased on a sliding scale based on the amount of movement within a video frame component. Quantization steps may be decreased based on categories associated with an amount of movement within encoding video frame components. Additionally, quantization steps may be decreased when motion within a video frame falls below a threshold associated with a particular quantization step and when there are sufficient bits to allocate to encoding a video frame component within the video frame.

Additionally, as seen in FIG. 4, distribution 440 illustrates a standardized bit allocation. In particular, distribution 440 illustrates a standardized bit allocation across blocks within a video frame. This is illustrated in distribution 440 as Block 1 and Block 2 being the same size to indicate that they are allocated the same amount of bits. An example of an optical flow field that may be associated with a distribution similar to distribution 440 is provided in FIG. 8. Further, distribution 450 illustrates an uneven bit allocation. In particular, distribution 450 illustrates an uneven bit allocation across blocks within a video frame. This is illustrated in distribution 450 as Block 1 is larger than Block 2, indicating that more bits are allocated to Block 1 than Block 2. An example of an optical flow field that may be associated with a distribution similar to distribution 450 is provided in FIG. 9.

Also as seen in FIG. 4, distribution 460 illustrates an uneven mutual augment bit allocation. In particular, distribution 460 illustrates an uneven mutual augment bit allocation across blocks within a video frame. This is illustrated in distribution 460 as Block 1 and Block 2 are both allocated more bits than standardized allocations that are provided in Blocks 1 and 2 of distribution 440. In contrast to standardized allocation of bits, distribution 460 provides that Block 2 is allocated an augmented amount of bits, and Block 1 is allocated more bits than Block 2. An example of an optical flow field that may be associated with a distribution similar to distribution 460 is provided in FIG. 10. Additionally, distribution 470 illustrates a multiple category bit allocation. In particular, distribution 470 illustrates a multiple category bit allocation across blocks within a video frame. This is illustrated in distribution 470 as Block 1 is allocated an augmented amount of bits; Block 2 is allocated a standardized amount of bits; and Block 3 is allocated a decreased amount of bits. An example of an optical flow field that may be associated with a distribution similar to distribution 470 is provided in FIG. 11.

Figure 5:
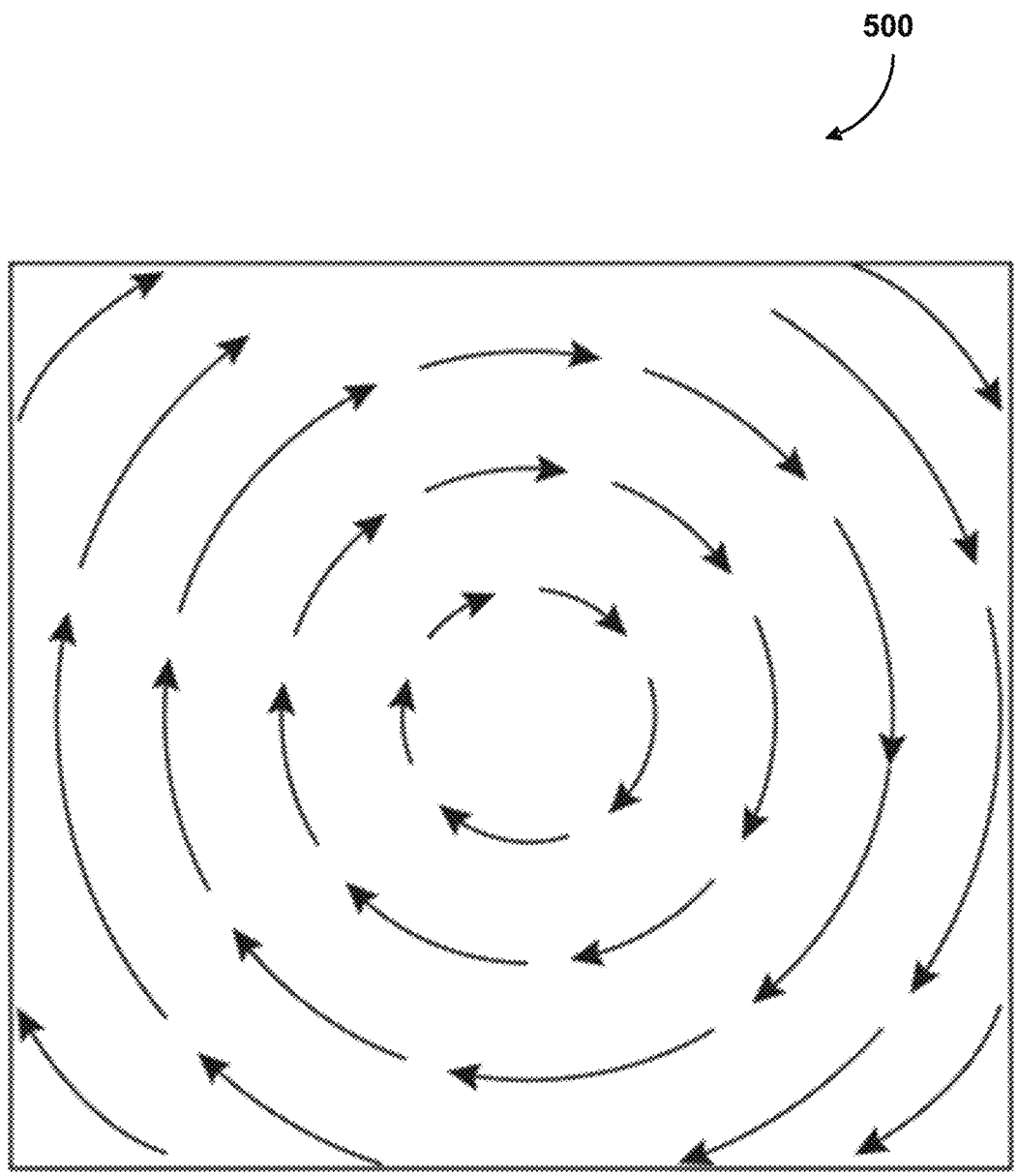
FIG. 5 illustrates an optical flow field that is associated with a rotating view from above for encoding a video frame, in accordance with embodiments of the invention.
Figure 6:
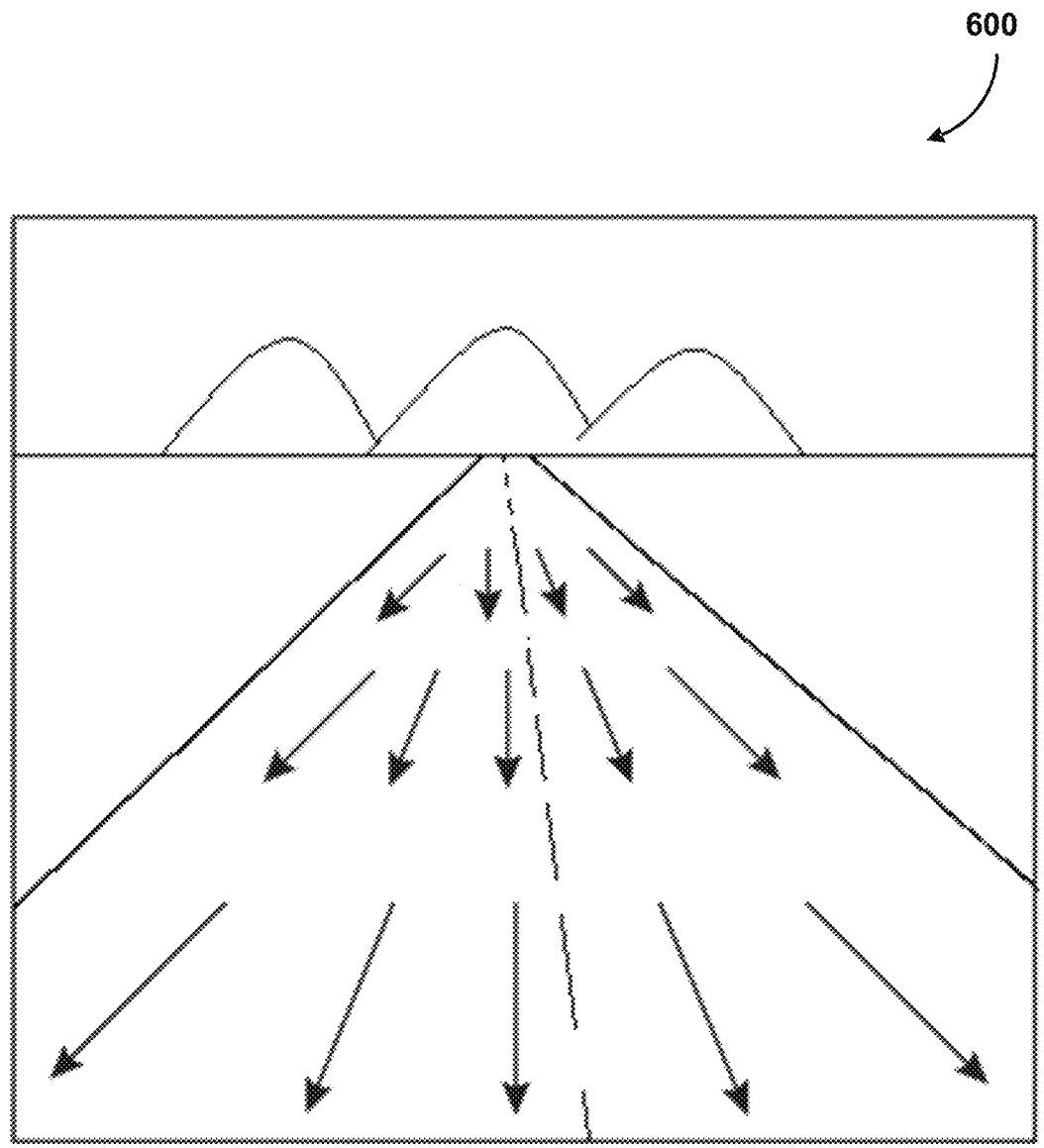
FIG. 6 illustrates a global optical flow field having different degrees of object movement for encoding a video frame, in accordance with embodiments of the invention.
Figure 7:
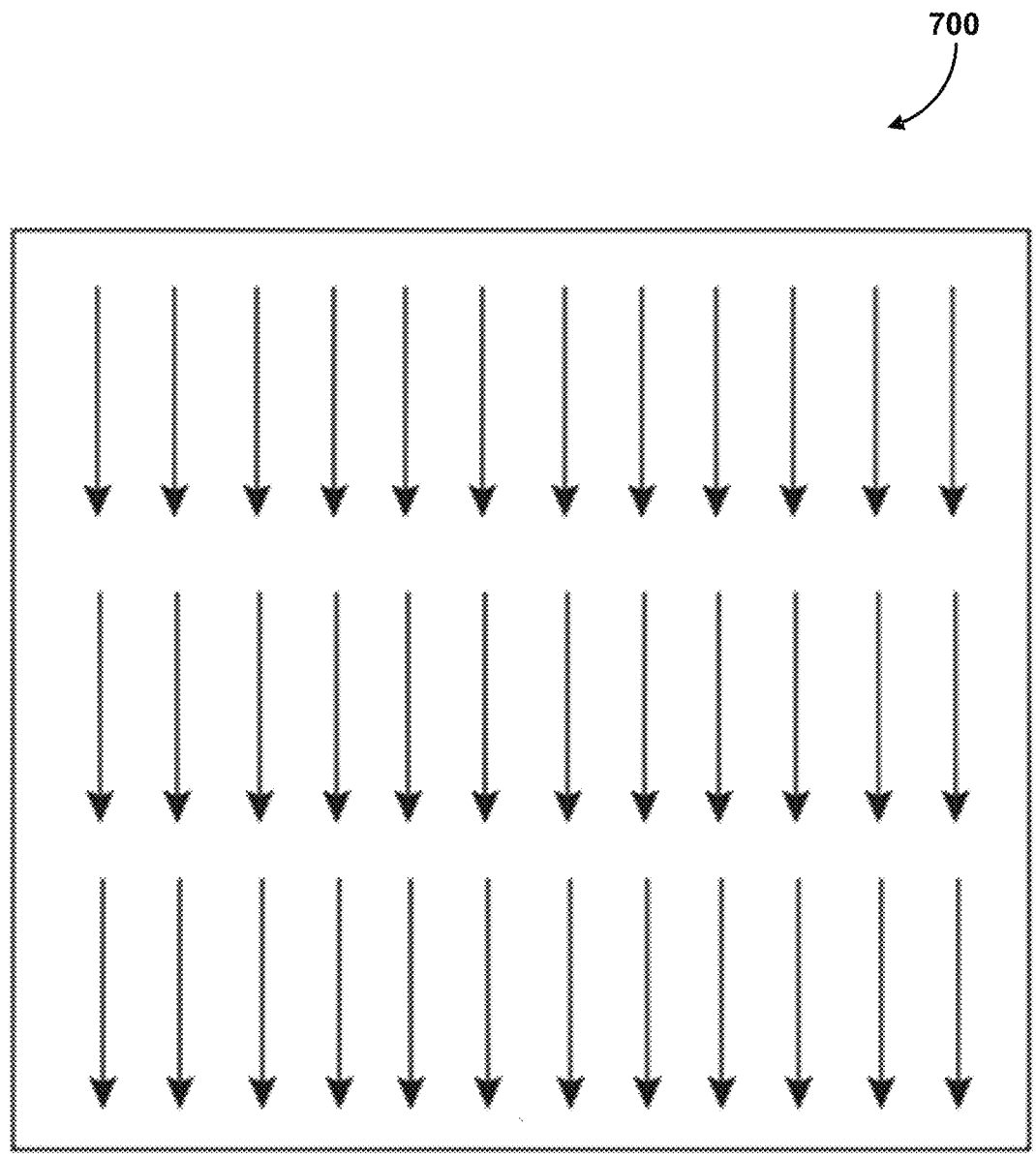
FIG. 7 illustrates an optical flow field that is associated with ultra-fast global camera motion for encoding a video frame, in accordance with embodiments of the invention.

Examples of video frames that may have differing degrees of bit allocation versus quantization step selection, given constant encoding cost per video frame, are provided in FIGS. 5-7. In examples, an optical flow field may be provided to contextualize video data that is being encoded by an encoding processor. An optical flow field may be generated based on image data. Additionally or alternatively, an optical flow field may be generated based on sensor data. In examples, the optical flow field may be generated using an optical flow field generated as discussed in FIG. 1. In some examples, the optical flow field can help to contextualize the video data so as to help the encoding processor encode video data on a frame-by-frame basis. In particular, on a frame-by-frame basis, the encoding processor may allocate more bits to a frame when an optical flow field associated with that frame indicates that the objects on the video frame are moving very fast. In examples where there are not bits available to allocate to video frames having a high amount of motion, the encoding processor may instead choose a quantization step (or a higher quantization step) so as to counteract the increase of the bitrate that would otherwise be caused by the high degree of motion within the video frame. Additionally, the encoding processor may decrease the number of bits allocated to a video frame if a large portion of the video frame is relatively still. Instead, the encoding processor may provide the bit allocation to another video frame that may have a high degree of motion.

FIG. 5 illustrates an optical flow field 500 that is associated with a rotating view from above for encoding a video frame, in accordance with embodiments of the invention. While optical flow field 500 is from above, other methods that are used to roll about an optical axis of a camera may also be used to generate a rotating view. Motion within the optical flow field is indicated using arrows. The length of the arrows indicates the amount of movement that is occurring across the optical flow field, and the curve of the arrows indicates the direction of movement that is occurring across the optical flow field. In examples, the video frame of FIG. 5 may have a relatively normal amount of motion throughout the video frame. While central portions of the video frame in FIG. 5 may be allocated slightly augmented bit allocations, given that motion in that area is dense, peripheral portions of the video frame illustrated in FIG. 5 may each be allocated a standard bit amount, given that motion in the peripheral portions is less dense than that in the central region. As such, FIG. 5 may merely have an augmented bit allocation, similar to adjustment 410 in FIG. 4. Additionally, as discussed above, the augmented bit allocation as provided in FIG. 5 may be within a threshold of encoding cost associated with a CBR of reconstructed video.

Additionally, FIG. 6 illustrates a global optical flow field 600 having different degrees of object movement for encoding a video frame, in accordance with embodiments of the invention. As seen in FIG. 6, some objects near the top of the optical flow field are relatively still. In particular, objects that seem to be relatively still may be far away from an image capture device, as objects that are moving at the same speed will have differing perceived speeds based on the distance of the object from a video capture device. Alternatively, objects that are moving at a constant speed may appear to be relatively still if a video capture device is moving at the same speed and in the same direction as the objects. In examples, the video capture device may be moving at a particular speed based upon movement of a UAV that attaches the video capture device. Alternatively, the video capture device may be moving at a particular speed based on the movement of the video capture device itself relative to a UAV to which it is attached.

When a significant amount of area within an optical flow field associated with a video frame appears to be relatively still, an encoding processor may choose to reduce the amount of bits that are allocated to the video frame. In particular, the encoding processor may shift some bits that may otherwise be allocated to video frames having still areas and may allocate those bits to video frames having areas with greater amounts of motion.

In contrast to the upper portion of the optical flow field in FIG. 6, some objects that are in the central and lower parts of the optical flow field are moving relatively fast. In particular, objects may seem to move relatively fast based on their movement relative to a video capture device. In particular, if a video capture device is moving quickly past a stationary object, the stationary object may seem to be moving quickly based on the movement of the video capture device. In examples, the perceived movement of objects may have a motion component that is associated with movement of the video capture device and/or may have a motion component that is associated with movement of a movable object, such as UAV, that attaches the video capture device.

However, given the large amount of area within the video frame that is relatively still, the overall allocation of bits to the video frame of FIG. 6 may still be reduced. As such, the video frame provided in FIG. 6 may have a reduced bit allocation, similar to adjustment 420 in FIG. 4.

In another example, FIG. 7 illustrates an optical flow field 700 that is associated with ultra-fast global camera motion for encoding a video frame, in accordance with embodiments of the invention. In particular, the optical flow field 700 that is provided in FIG. 7 has a uniformly downward direction. Additionally, the downward direction of motion arrows is illustrated as being fast due to a high density of arrows. In examples, the downward direction of the optical flow field may appear to be fast in the video data based on one or more objects that are moving quickly past a video capture device. In other examples, the downward direction of the optical flow field may appear to be fast in the video data based on the movement of a video capture device relative to object within the captured video data. In further examples, the downward direction of motion arrows within the optical flow field may appear to be fast in the video data based on a combination of the objects that are moving quickly past the video capture device and the fast movement of the video capture device itself.

As the directionality in the optical flow field has a uniformly downward direction, the same amount of bits may be allocated across the video frame. However, given the great amount of movement, there may be insufficient bits available to capture the high degree of motion. Accordingly, when a significant amount of area within an optical flow field associated with a video frame appears to move relatively fast, an encoding processor may choose to select a quantization step (or to select an increased quantization step) to use when encoding video data associated with the video frame. As such, the video frame provided in FIG. 7 may have an increased quantization step selected by the encoding processor, similar to adjustment 430 in FIG. 4.

Additional examples of video frames that may have differing degrees of bit allocation versus quantization step selection, given constant encoding cost per video frame, are provided in FIGS. 8-11. In examples, the optical flow field can help to contextualize the video data so as to help the encoding processor encode video data within a video frame on a block-by-block basis. In particular, among different blocks within a video frame, the optical flow field can indicate whether some portion of a video frame are moving faster than other portions. These portions of the video frame may be represented by blocks within the video frame. As such, on a block-by-block basis, the encoding processor may allocate the bitrate within a frame globally and differentially across blocks within the video frame. In particular, the encoding processor may allocate more bits to blocks when an optical flow field indicates that the objects moving through the blocks are moving very fast. In examples where there are not enough bits available to allocate to blocks that are associated with a high amount of motion, the encoding processor may instead choose a quantization step (or a higher quantization step) so as to counteract the increase of the bitrate that would otherwise be caused by the high degree of motion within the blocks. Additionally, the encoding processor may decrease the number of bits allocated to blocks that are relatively still. Instead, the encoding processor may provide the bit allocation to another block(s) that may have a high degree of motion.

Figure 8:
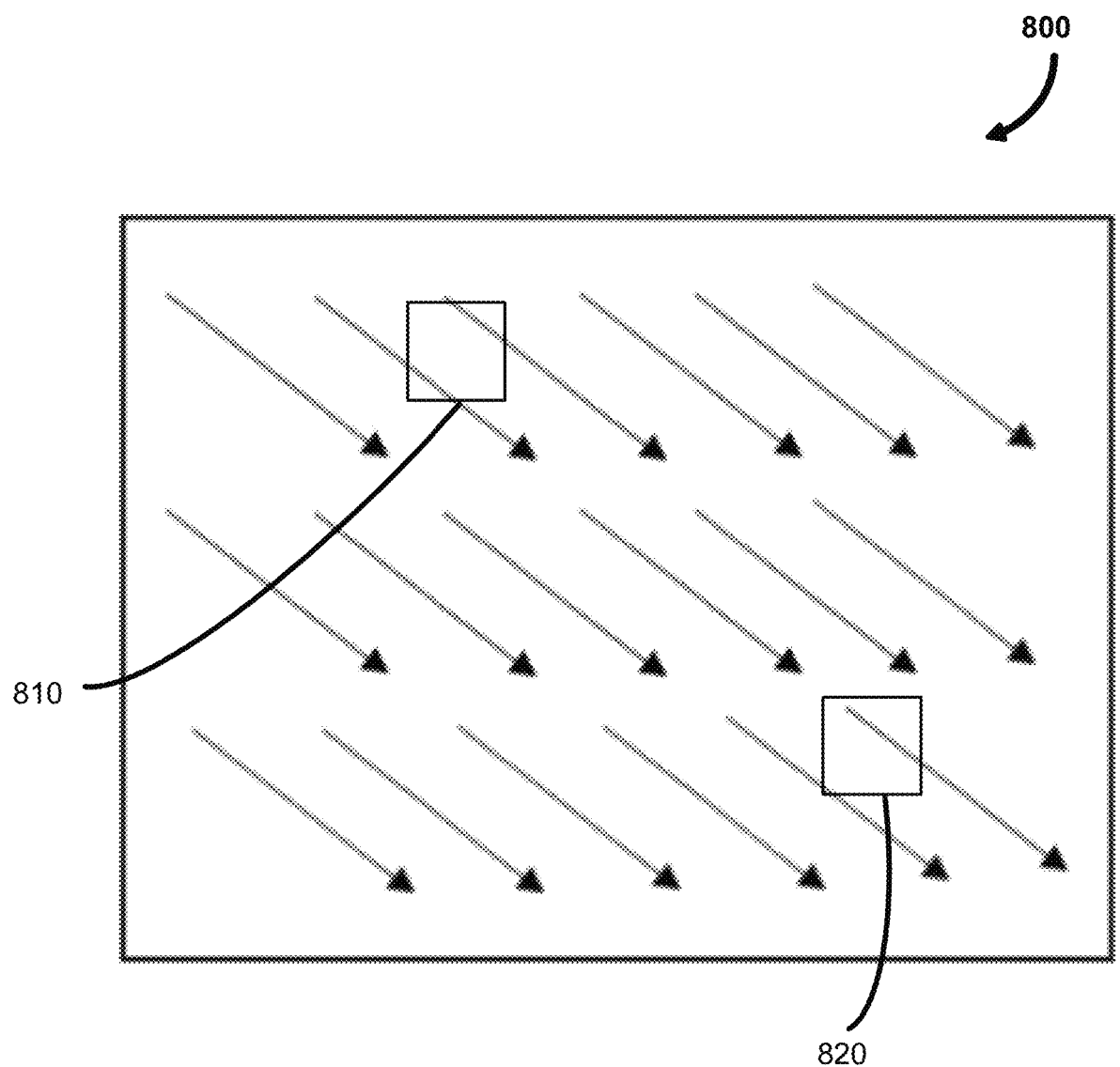
FIG. 8 illustrates two video frame components, which are to be encoded, within an optical flow field that is associated with angled global motion, in accordance with embodiments of the invention.

In examples, FIG. 8 illustrates two video frame components, which are to be encoded, within an optical flow field 800 that is associated with angled global motion, in accordance with embodiments of the invention. In particular, the optical flow field that is provided in FIG. 8 has a uniformly angled direction towards the bottom right corner of the optical flow field. In examples, the direction of motion arrows within the optical flow field may appear to be angled in the video data based on one or more objects that are moving at an angle past a video capture device. In other examples, the direction of motion arrows within the optical flow field may appear to be angled in the video data based on an angled movement of a video capture device relative to objects within the captured video data. In further examples, the direction of motion arrows within the optical flow field may appear to be angled in the video data based on a combination of the objects that are moving at an angle past the video capture device and the movement of the video capture device itself.

FIG. 8 also provides two blocks, block 810 and block 820, that are video frame components of a video frame. In examples, an encoding processor that is encoding the video frame having blocks 810 and 820 may allocate bits evenly or unevenly across the video frame. In particular, the distribution of bits across the video frame may be based on motion data that is associated with the video frame. As seen in FIG. 8, the motion data provided by the optical flow field indicates that there is uniform motion across the video frame. As such, the encoding processor may allocate an equal amount of bits across blocks 810 and 820. In this way, FIG. 8 may have a standardized bit allocation, similar to adjustment 440 in FIG. 4.

Figure 9:
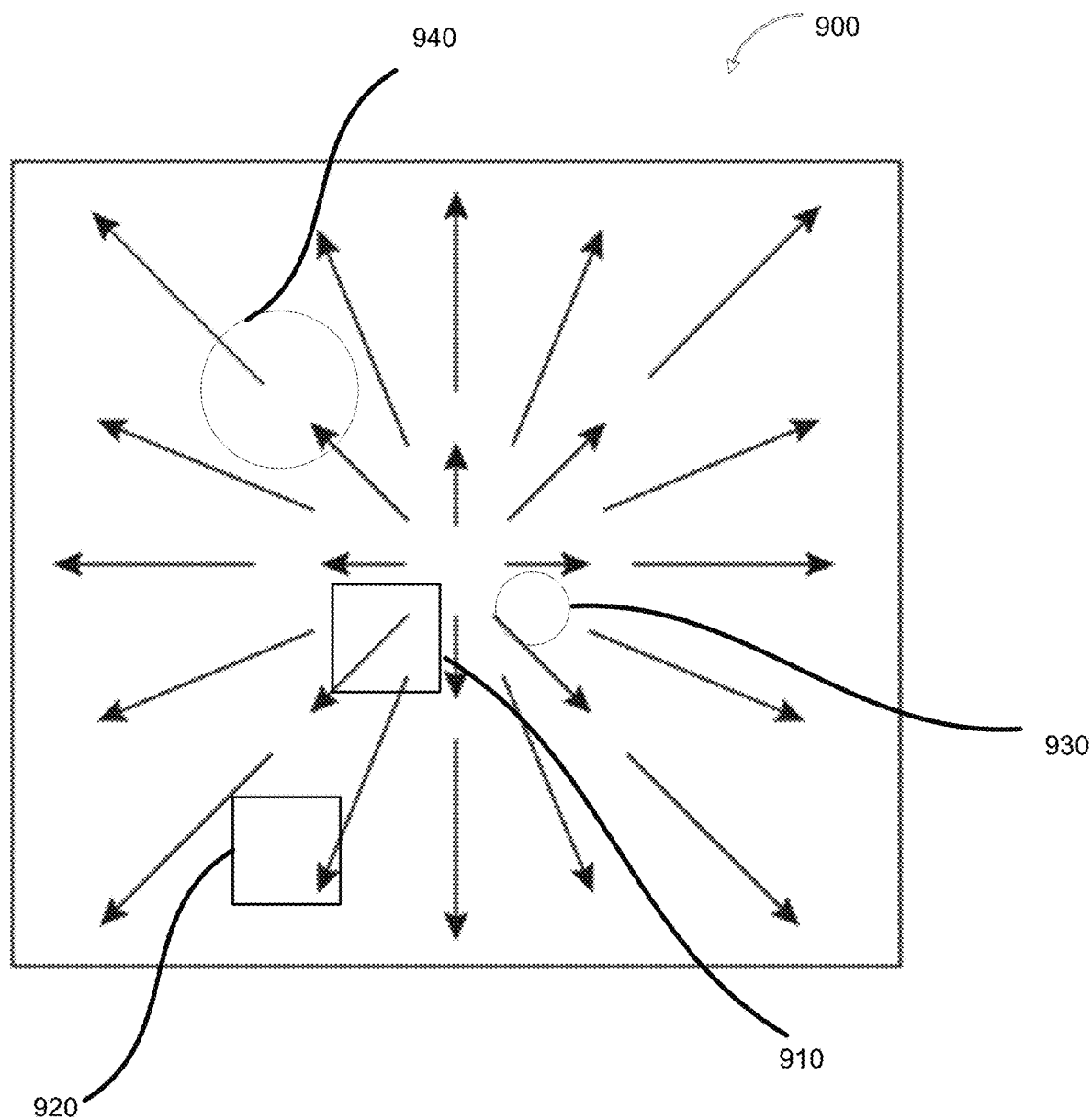
FIG. 9 illustrates two video frame components, which are to be encoded, within an optical flow field that is associated with a zoom-in feature that is associated with a camera, in accordance with embodiments of the invention.

Additionally, FIG. 9 illustrates two video frame components, which are to be encoded, within an optical flow field that is associated with a zoom-in feature that is associated with a camera, in accordance with embodiments of the invention. In examples, the zoom-in feature may occur based on a video capture device zooming in on an object; based on the support area of an aerial vehicle that allows a camera to move in closer; or a combination of the two. As seen in FIG. 9, movement at the edge of the optical flow field is larger than movement at the middle of the optical flow field. Additionally, the directionality of the zoom-in is equal across the optical flow field. In other words, there is no apparent bias in a vertical or horizontal distance, as each direction is moving in a similar fashion. However, while there is no directional bias, the motion within FIG. 9 is more concentrated near central areas and the motion within FIG. 9 is more sparse near peripheral areas.

FIG. 9 also provides two blocks, block 910 and block 920, that are video frame components of a video frame. In examples, an encoding processor that is encoding the video frame having blocks 910 and 920 may allocate bits evenly or unevenly across the video frame. In particular, the distribution of bits across the video frame may be based on motion data that is associated with the video frame. As seen in FIG. 9, the motion data provided by the optical flow field indicates that there is a greater concentration in the central portion of the video frame than the peripheral portion of the video frame. Additionally, block 910 is relatively centrally located while block 920 is located closer to the peripheral portion of the video frame. Accordingly, an encoding processor may allocate more bits to block 910, as block 910 has a centralized location in the video frame that has a high degree of motion. Conversely, block 920 may be allocated a standard amount of bits and/or a lesser amount of bits than block 910. As such, the encoding processor may allocate an unequal amount of bits across blocks 910 and 920. Accordingly, FIG. 9 may have a disproportionate bit allocation, similar to adjustment 450 in FIG. 4.

The relationship of the perceived size of objects within an optical flow field may vary based on location of the objects within the optical flow field. For example, when an optical flow field is generated based on a zoom-in action, objects that are the same size in real life may appear to be larger as they are located further to the edge of the optical flow field. This is illustrated in FIG. 9, which illustrates a first ball 930 that is near a normalized minimum at the center of the optical flow field and a second ball 940 that is near a periphery of the optical flow field. Although first ball 930 and second ball 940 are of equal size, they appear to be of different sizes when viewed in context of the optical flow field. Accordingly, the perceived size of objects may vary across optical flow fields. In particular, the perceived size of objects may vary in a manner that is directly proportional, inversely proportional, or modeled by another equation as objects are placed at different locations across the optical flow field.

Figure 10:
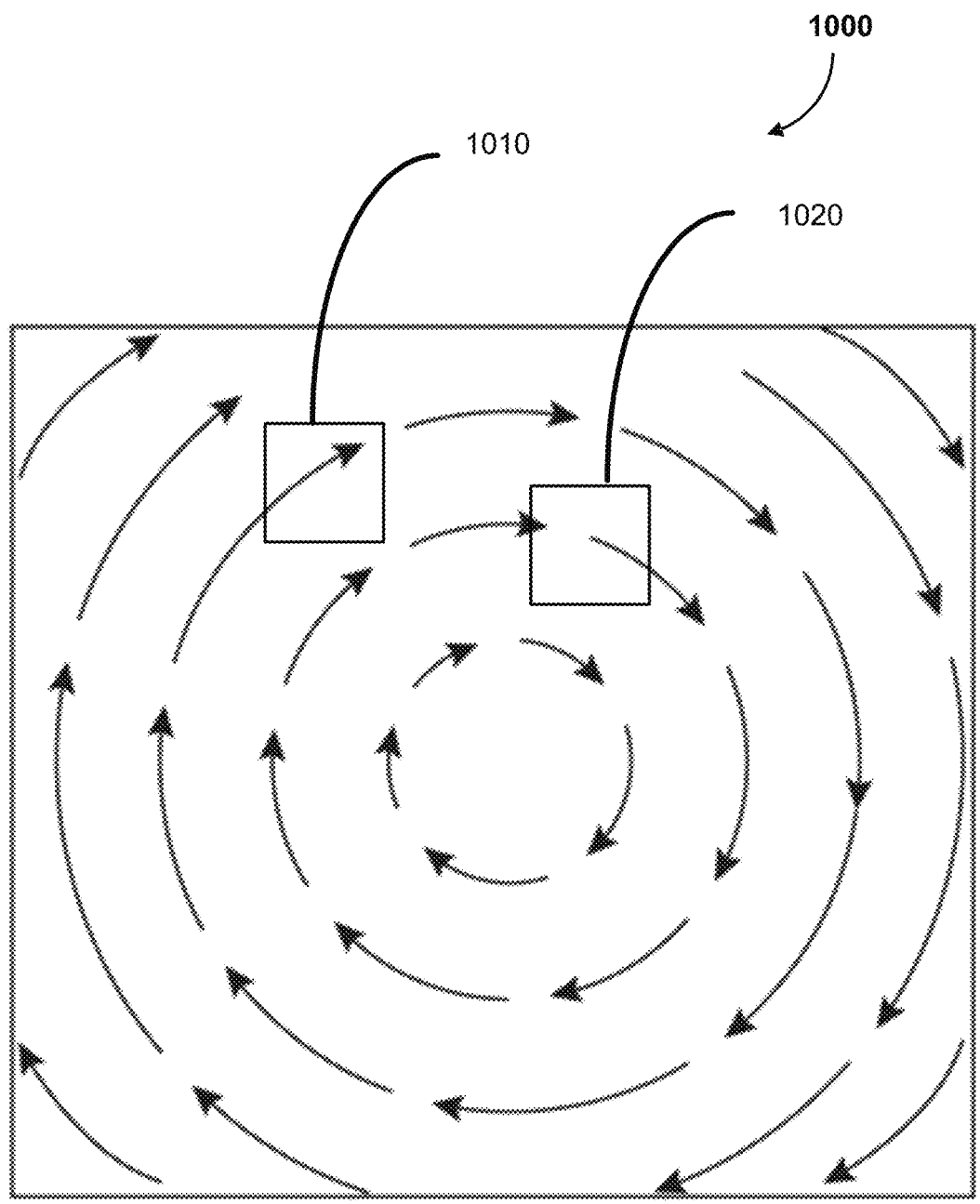
FIG. 10 illustrates two video frame components, which are to be encoded, within an optical flow field that is associated with a rotating view from above, in accordance with embodiments of the invention.

In additional examples, FIG. 10 illustrates two video frame components, which are to be encoded, within an optical flow field 1000 that is associated with a rotating view from above, in accordance with embodiments of the invention. As seen in FIG. 5, motion within the optical flow field is indicated using arrows. The length of the arrows indicates the amount of movement that is occurring across the optical flow field, and the curve of the arrows indicates the direction of movement that is occurring across the optical flow field. FIG. 10 also provides two blocks, block 1010 and block 1020, that are video frame components of a video frame. When an encoding processor encodes the video frame, a distribution of bits across the video frame may be based on motion data that is associated with the video frame. As seen in FIG. 10, the motion data provided by the optical flow field indicates that the relative motion associated with rotation within the video frame is generally constant. However, similar to FIG. 9, the optical flow field within FIG. 10 also indicates that there is a greater concentration of motion in the central portion of the video frame than the peripheral portion of the video frame. Additionally, block 1010 is relatively centrally located while block 1020 is located closer to the peripheral portion of the video frame. Accordingly, an encoding processor may allocate more bits to block 1010, as block 1010 has a centralized location in the video frame that has a greater amount of motion. The encoding processor may also allocate additional bits to block 1020, but the augmented bits for block 1020 may be less than the amount of bits allocated to block 1010. As such, the encoding processor may allocate an unequal amount of bits across blocks 1010 and 1020. In this way, FIG. 10 may have an uneven, but mutually augmented, bit allocation, similar to adjustment 460 in FIG. 4.

Figure 11:
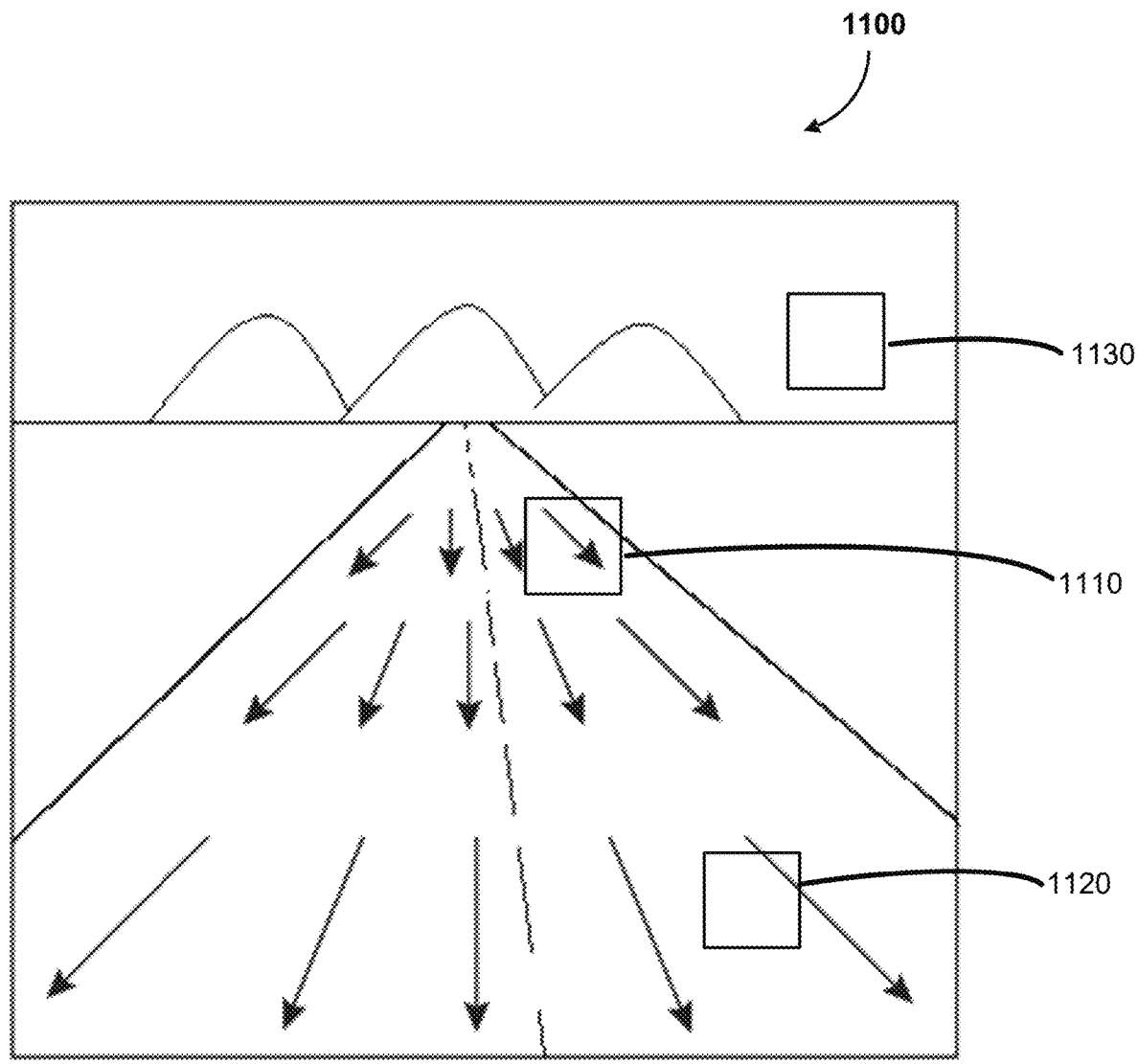
FIG. 11 illustrates three video frame components, which are to be encoded, within a global optical flow field having different degrees of object movement, in accordance with embodiments of the invention.

Further, FIG. 11 illustrates three video frame components, which are to be encoded, within a global optical flow field 1100 having different degrees of object movement, in accordance with embodiments of the invention. In particular, FIG. 11 provides an example of an optical flow field that has different rates of movement associated with objects within a video frame. As seen in FIG. 11, some objects near the top of the optical flow field are relatively still. In contrast, some objects that are in the central and lower part of the optical flow field are moving relatively fast. In particular, objects may seem to move relatively fast based on their movement relative to a video capture device.

An encoding processor that encodes the video frame provided in FIG. 11 may provide at least three categories of bit distribution across the video frame may be based on motion data that is associated with the video frame. In example, the encoding processor may provide 1 or more, 2 or more, 3 or more, 4 or more, 5 or more, 6 or more, 7 or more, 8 or more, 9 or more, 10 or more, 11 or more, 12 or more, 13 or more, 14 or more, 15 or more, 16 or more, 17 or more, 18 or more, 19 or more, 20 or more, 21 or more, 22 or more, 23 or more, 24 or more, 25 or more, 30 or more, 35 or more, 40 or more, 45 or more, 50 or more, 60 or more, 70 or more, 80 or more, 90 or more, 100 or more, or more than 100 categories of bit distribution. Not all categories that are available for bit distribution by the encoder may be present in any given video frame. In examples, however, at least one bit distribution category may be provided in each video frame that is encoder by the encoding processor. As seen in FIG. 11, the motion data provided by the optical flow field indicates that the relative motion associated with rotation within the video frame falls into at least three general categories: fast, standard, and relatively still. In particular, block 1110 is fast, block 1120 is standard, and block 1130 is relatively still. Accordingly, an encoding processor may allocate more bits to block 1110 than to block 1120, as block 1110 has a greater amount of motion than block 1120. Additionally, the encoding processor may allocate more bits to block 1120 than to block 1130, as block 1120 has a greater amount of motion than block 1130. In examples where the stillness of block 1130 falls below a movement threshold, the encoding processor may reduce the amount of bits allocated to block 1130. As such, the encoding processor may allocate an unequal amount of bits across blocks 1110, 1120, and 1130. In this way, FIG. 11 may have bit allocation associated with multiple categories, similar to adjustment 470 in FIG. 4.

Figure 12:
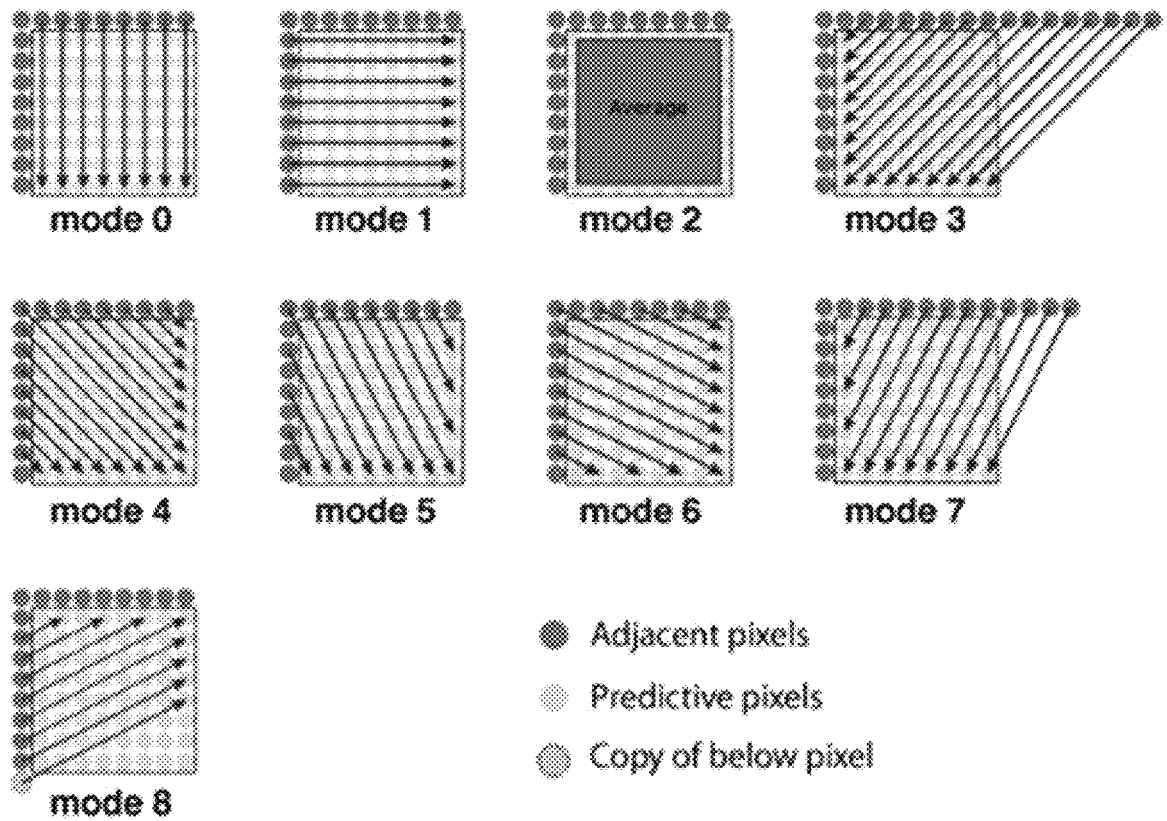
FIG. 12 illustrates examples of intra coding of pixels within a block in a video frame component, in accordance with embodiments of the invention.
Figure 13:
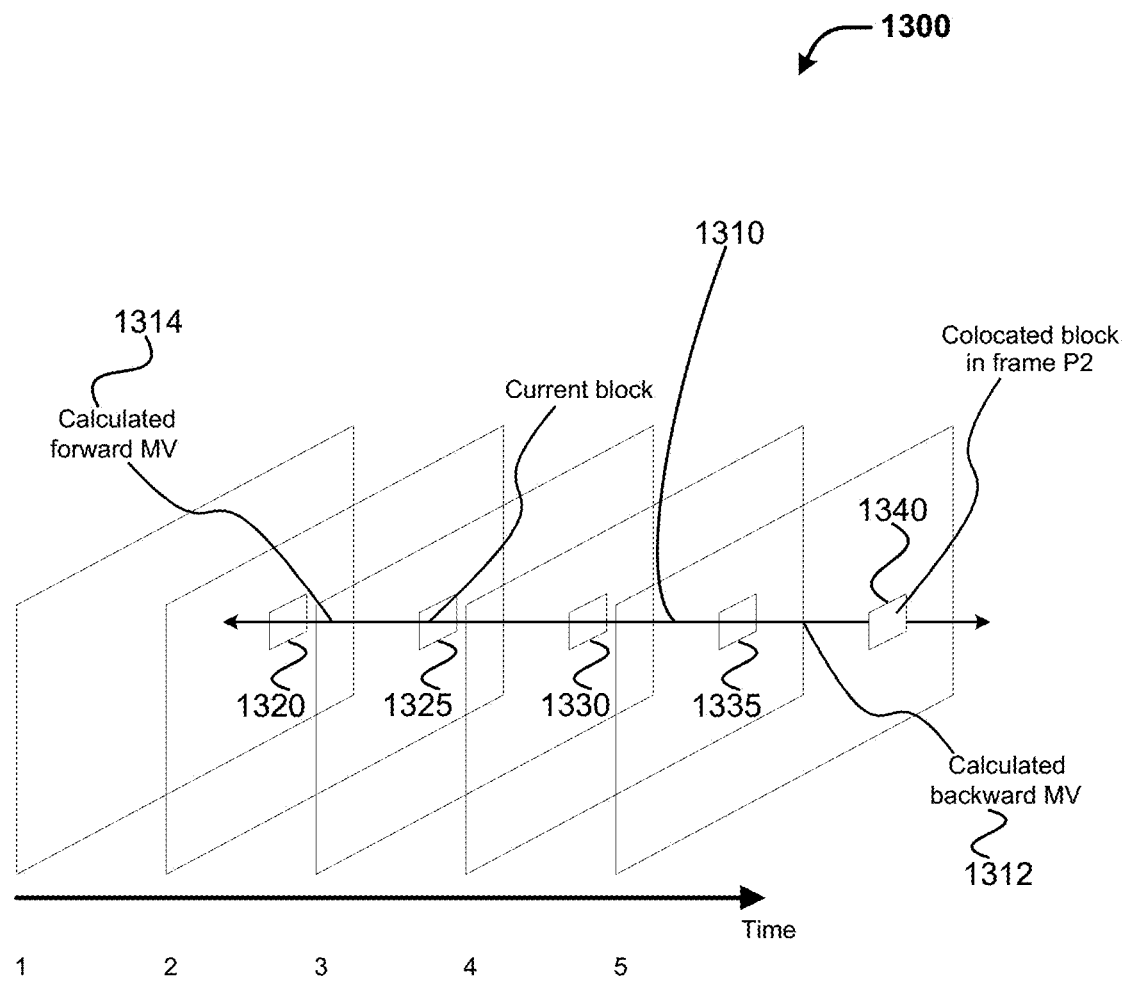
FIG. 13 illustrates motion vectors linking co-located blocks across video frames, in accordance with embodiments of the invention.
Figure 14:
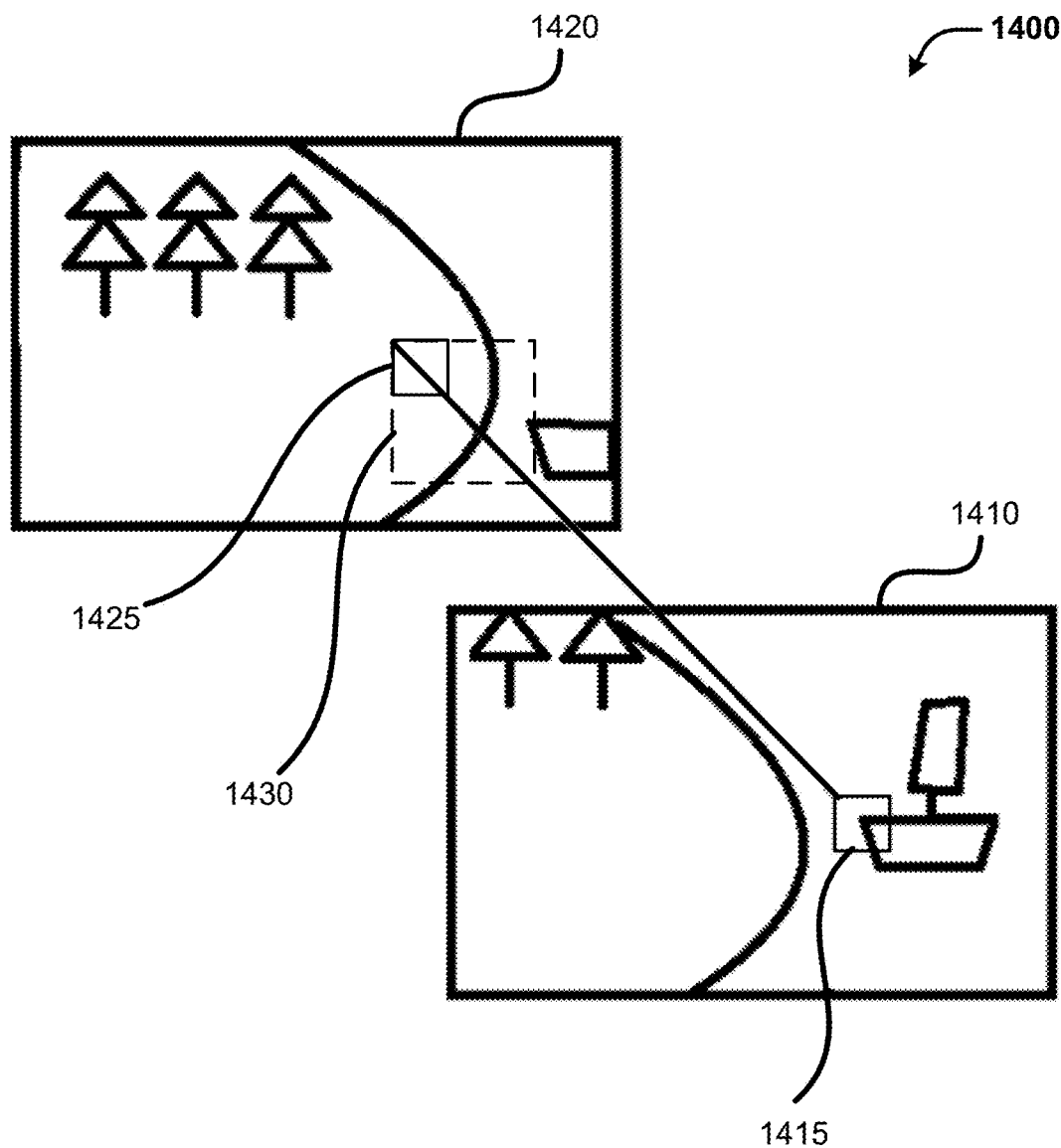
FIG. 14 illustrates a structure of prioritizing calculation of a coefficient between frames rather than searching for a motion vector, in accordance with embodiments of the invention.

Further examples of video frames that may have differing degrees of bit allocation versus quantization step selection, given constant encoding cost per video frame, are provided in FIGS. 12-14. In examples, the optical flow field can help to contextualize the video data so as to help the encoding processor encode video data within a video frame within and between video frame components. In particular, within and between block components, an optical flow field may be used to tune the bits that are allocated on 1) identifying a motion vector, and 2) calculating a coefficient. In examples, when motion within a video frame is severe, thereby increase the total amount of motion information that is associated with the video frame, an example of a tuning strategy may allocate more bits to calculating a coefficient rather than identifying a motion vector. In particular, if more bits are allocated towards calculating a coefficient, the integrity of a consistent motion vectors field may be maintained. Under this strategy, the maintenance of the motion vectors field is prioritized over the search for a motion vector, as it is generally very costly in terms of bit allocation to search for a motion vector when motion between video frame components is above a certain threshold of motion. Additionally, when the motion data associated with a video frame exceeds a certain threshold of activity, it is easier for the encoding processor to make a mistake in the identification of the motion vector. Further, the misidentification of a motion vector may propagate a series of errors that are not generally easy to trace back. Accordingly, under some strategies, bits are preferentially allocated to calculating an accurate coefficient rather than identifying a motion vector.

In examples, the prioritization of calculating a coefficient over identifying a motion vector may be applied both in determining a current block's quantization step as well as contributing to the RDO in a motion search. Accordingly, if motion within a video frame is severe (e.g., exceeds a certain threshold), the RDO cost function may be adjusted so that a more precise motion vector may be identified. In this way, bits that may be allocated to encode the residual data between video frame components may be saved. Additionally or alternatively, a smaller quantization step may be applied to produce visual quality of reconfigured frames that exceeds a threshold associated with the determined RDO.

Accordingly, the calculation of coefficients when encoding video data may be prioritized over the identification of motion vectors when motion within a video frame is severe. In particular, the calculation of coefficients may be based on residual data between video frames when encoding video data, such as when an encoding processor utilizes intra coding and/or inter coding. Accordingly, FIG. 12 illustrates examples of intra coding of pixels within a block in a video frame component, in accordance with embodiments of the invention.

Intra coding may be used to condense spatial correlations. For a block within a video frame, a predictor of pixel values within the block may be estimated from its neighboring pixels. For example, a predictor of pixel values may be estimated from neighboring pixels such as the upper, left upper right, and lower left neighboring pixels. Examples of these predications may be directional so as to correspond with the pattern within a pixel block. A demonstration of H.264 directional intra prediction is provided in FIG. 12.

FIG. 12 illustrates examples of intra coding of pixels within a block in a video frame component, in accordance with embodiments of the invention. As seen in FIG. 12, pixels that are adjacent to a block may be used to predict motion of pixels within the block. In particular, when intra coding is used, the pixels adjacent to a block are assessed for motion data. In FIG. 12, the pixels that are assessed are in a column to the left of the block and in a column above the block. The assessed motion of the blocks may be associated with a particular mode that is used by an encoding processor. As all of the adjacent pixels may not have the same motion information, a mode of assessed motion may be assigned to a block when the adjacent pixels have a threshold number of pixels being associated with a particular mode. In examples, the adjacent pixels may be assigned to a particular mode when any of 100%, 95%, 90%, 85%, 80%, 75%, 70%, 65%, 60%, 55%, over 50%, 50%, or a majority of adjacent pixels are associated with a particular mode.

Additionally, the mode that is assigned to the adjacent pixels may be used to determine the predictive motion of the pixels in the block. For example, in mode 0, the pixels that are adjacent to a block may be assessed as having a downward motion. As seen in FIG. 12, this downward motion may be used to predict a downward motion through the predictive pixels. As provided in FIG. 12, the downward motion through the predictive pixels is entirely based on the assessed motion of the upper column of adjacent pixels above the block.

In mode 1, the pixels that are adjacent to a block may be assessed as having a sideways motion. As seen in FIG. 12, this sideways motion may be used to predict a motion to the right throughout the predictive pixels. As provided in FIG. 12, the sideways motion through the predictive pixels is entirely based on the assessed motion of the left column of adjacent pixels next to the block. In mode 2, the pixels that are adjacent to the block may be assessed as having a normal, or neutral, movement. Based on this assessment, the pixels within the block may be assessed to have a neutral movement as well.

In mode 3, the pixels that are adjacent to a block, and in close proximity to the upper portion of the block, may be assessed as having a leftward angled motion. As seen in FIG. 12, this leftward angled motion may be used to predict a motion to the downward left throughout the predictive pixels. As provided in FIG. 12, the downwardly sideways motion through the predictive pixels is entirely based on the assessed motion of the upper column of adjacent pixels next to the block, as well as an upper column of pixels that are in close proximity to the block. Similarly, in mode 7, the pixels that are adjacent to the block may also be assessed as having a downward leftward angled motion. However, the angle of the downward leftward angled motion as seen in mode 7 may be steeper than the downward angled motion as seen in mode 3.

In mode 4, the pixels that are adjacent to the block may be assessed as having a rightward angled motion. As seen in FIG. 12, this rightward angled motion may be used to predict a motion to the downward right throughout the predictive pixels. Similarly, in mode 5 the pixels that are adjacent to the block may also be assessed as having a rightward angled motion, though the angled motion as illustrated in mode 5 is steeper than the angled motion in mode 4. Additionally, in mode 6 the pixels that are adjacent to the block may also be assessed as having a rightward angled motion, though the angled motion as illustrated in mode 6 is more shallow than the angled motion in modes 4 or 5.

Additionally, mode 8 provides adjacent pixels to a block that indicate a motion that is upwards and to the right. However, mode 8 differs from previous modes in that mode 8 is only able to predict a portion of the block. For assessing the additional predictive pixels within the block, other auxiliary methods may be used.

While intra coding utilizes neighboring pixels of a block, such as pixels on the left column and the upper row of a current block, there may be a significant amount of residual information that is included within the central pixels of a block. In examples, the central pixels of a block may include textures, objects, and other information that may not be readily predicted using intra coding. To capture this information, information between frames (e.g. temporal compression) may be condensed and encoded.

Inter coding may be used to condense temporal correlations. For a block within a video frame, a predictor of pixel values within the block may be estimated from a correlating block within a previous frame. As video frames may only be separated by a few millionths of a second, blocks between frames may not generally differ greatly. However, the use of inter coding may be useful for predicting details within a block that would not be captured using intra frame coding. In particular, these details are predicted by referencing block from nearby video frames. In particular, blocks that are correlated between frames may be linked using a motion vector.

When implementing inter coding, initially an inter frame motion estimation may be performed on the encoding block. The motion estimation process may determine a grid of pixels which may be considered most similar and most costless to a current block. In particular, the motion estimation may determine the grid of pixels that is considered most similar by conducting a search within a search area of a video frame. Once a grid of pixels which is considered the most similar and most costless to the current block is determined, a motion vector may be calculated. In particular, the motion vector may be calculated as comprising the 2D pixel location difference between the current block of a first frame and its reference block of a video frame that is temporally related to the first frame. In examples, the 2D pixel location difference may use subpixel interpolation so as to define motion between frames by integer pixels, half pixels, quarter pixels, etc. An illustration of calculating a motion vector is illustrated in FIG. 13.

Accordingly, FIG. 13 provides an illustration 1300 of motion vectors linking co-located blocks across video frames, in accordance with embodiments of the invention. In particular, FIG. 13 illustrates motion vectors linking co-located blocks across video frames, in accordance with embodiments of the invention. As seen in FIG. 13, a motion vector 1310 may link blocks 1320-1340 across video frames. Using the motion vector, a calculated motion vector may be predicted from neighboring and/or nearby video frames, even if those neighboring video frames are ahead in time, as illustrated by calculated backward motion vector (MV) 1312 and calculated forward MV 1314. This may be due to the compression of information between inter coding. In particular, during inter coding, temporal information may be compressed, particularly by linking blocks together using motion vectors and other relational information.

Once a motion vector is determined, the motion vector may be provided to a decoder side within the encoding system. When the decoder receives this information, the decoder may find a corresponding location of a first block on a reference frame that may be linked to a block that is being processed. In this way, the motion vector may be used by the decoder to find a reference. Subsequently, the difference between the reference and the current block (e.g., the motion vector) may be processed and transmitted.

Header information coding may also be used to efficiently encode video data. In particular, header information that is related to a motion vector and header information that is related to a skip mode may be used to encode video data that is captured by a UAV.

Regarding motion vectors, a current block and its spatial neighboring block within the same video frame may have a high probability of sharing the same motion vectors. Moreover, the motion vector temporally corresponding to a current block may also serve as a predictor of the motion vector of the current block. As such, a motion vector predictor (MVP) for a current block may be calculated based on a current block's spatially and temporally neighboring blocks. The calculation of a MVP may depend on the standards of an encoding processor.

Additionally, regarding a skip mode, additional information that is within a header of a current block may also be predicted from neighboring blocks. Further, in examples where a current block may be fully predicted from its neighboring blocks, the header of the current block may be marked as a skip block. In particular, a skip block may be used to indicate that no residual information is transmitted. In examples, a skip may be used when the information within the current block may be calculated based on the information of blocks that neighbor the current block.

FIG. 14 illustrates a structure of prioritizing calculation of a coefficient between frames rather than searching for a motion vector, in accordance with embodiments of the invention. In particular, FIG. 14 provides an illustration 1400 of two video frames within a video that is captured by a UAV. The two video frames include objects such as trees, a coast, and a boat. In particular, a first frame 1410 is a currently encoded frame and second, adjacent frame 1420 is a predictive frame. In terms of calculating a coefficient, the differences between the first frame 1410 and the second frame 1420 may be assessed. As provided in FIG. 14, a residual amount consists of additional portions of trees, as well as the removal of a portion of the board between the pictures. In examples, a residual amount between two frames comprises the differences between the two frames. Additionally, a block 1415 of the currently encoded frame is associated with a particular motion vector.

In examples when motion data within a video frame is severe, bits may be preferably allocated towards calculating a coefficient. For examples, bits may be allocated towards residual describing new trees in the second frame, as well as a residual discussing a removal of the boat. In particular, the difference between an original block and its predictor may be called the residual, and this residual between blocks may be represented as a coefficient. Additionally, the motion data within a video frame may be determined to be severe when the motion data exceeds a particular threshold of an amount of motion data associated with the video frame. This may be determined based on an optical flow field that is aligned with the video frame. Additionally or alternatively, motion data that is associated with a video frame may be calculated by assessing motion data of adjacent and/or nearby video frames.

In other examples, such as when the motion data within a video frame does not exceed a threshold of motion data so as to be deemed "severe," bits may be allocated equally between calculating a coefficient associated with the video frame and identifying a motion vector within the video frame. In particular, a motion vector may be identified by providing a search area within the video frame. As motion within a video frame is increasingly intense, the size of a search area within the video frame may be increased. In examples, the size of a search area may be increased as the intensity of motion within a video frame is increased. Additionally, as the intensity of motion within a video frame is increased, the shape of the search area may be modified. In particular, as the intensity of the motion within the video frame is increased, the search area may be modified from a square to a circle. The shape of the search area may also be modified based on the optical flow field. In particular, if an optical flow field indicates that there is a high degree of vertical movement, the search area within a video frame may have an increased vertical component, such as changing the shape of the search are a square to a vertically biased rectangle. An illustration of modifying the search area associated with a block of adjacent frame 1420 is provided. In particular, the search area is modified so as to increase the chances of the motion estimation prediction evaluation to identify the motion vector that corresponds to the block within the second frame. When evaluating frame 1420 for a motion vector to link block 1425 with encoded block 1415, a search area 1430 may be assessed.

Figure 15:
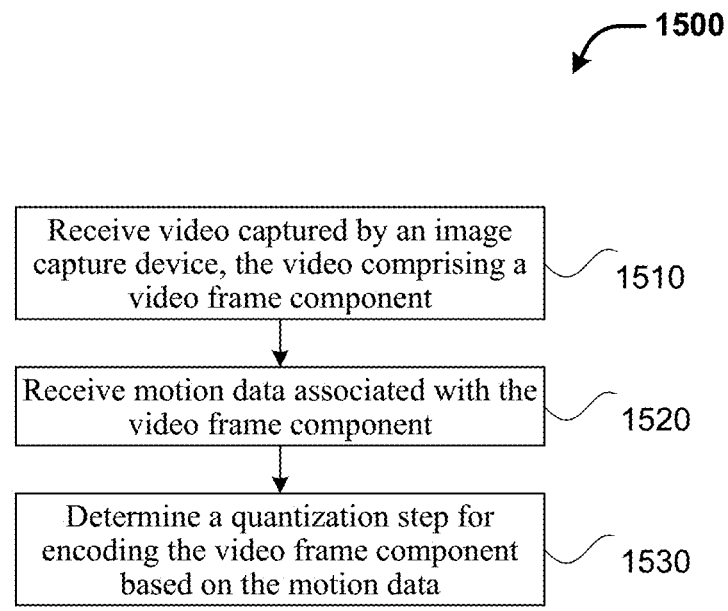
FIG. 15 is a flow chart illustrating a method of determining a quantization step for encoding video based on motion data, in accordance with embodiments of the invention.

FIG. 15 is a flow chart illustrating a method 1500 of determining a quantization step for encoding video based on motion data, in accordance with embodiments of the invention. At block 1510, video captured by an image capture device is received. In particular, the video comprises a video frame component. The image capture device may be installed on a movable object, such as an unmanned aerial vehicle. Additionally, the video that is captured may be captured by the image capture device while the UAV is in flight. At block 1520, motion data associated with the video frame component is received. In examples, the motion data may include optical flow field data. Alternatively, motion data may include sensor data. In examples, optical flow field data may be generated from sensor data. In additional examples, the motion data may indicate that a first portion of the video frame has a higher degree of movement than a second portion of the video frame. Additionally, at block 1530, a quantization step for encoding the video frame component based on the motion data is determined. In examples, determining a quantization step may comprise an encoding processor choosing a first quantization step for encoding the first portion of a video frame and choosing a second, less comprehensive quantization step for encoding a second portion of the video frame.

Figure 16:
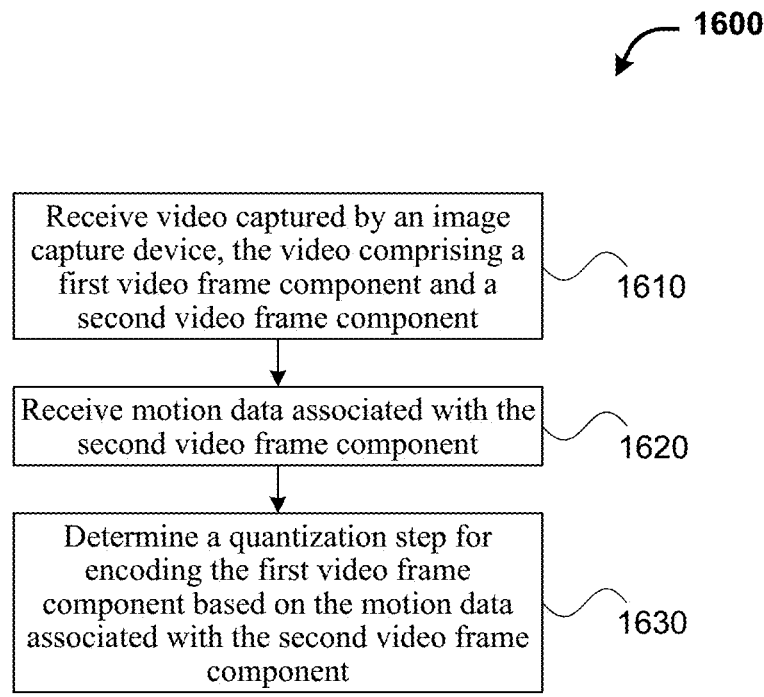
FIG. 16 is a flow chart illustrating another method of determining a quantization step for encoding video based on motion data, in accordance with embodiments of the invention.

FIG. 16 is a flow chart illustrating another method 1600 of determining a quantization step for encoding video based on motion data, in accordance with embodiments of the invention. At block 1610, video captured by an image capture device, the video comprising a first video frame component and a second video frame component is received. The video comprises a video frame. The video may be captured by an image capture device. At block 1620, motion data associated with the second video frame component is received. In examples, the motion data may be obtained using one or more sensors. In further examples, the sensors may comprise on or more of an optical sensor, ultrasonic sensor, MVO, gyroscope, GPS, and altimeter. Additionally, at block 1630, a quantization step for encoding the first video frame component is determined based on the motion data associated with the second video frame component. In particular, the determining a quantization step may comprise choosing a quantization step for encoding the first video frame that minimizes loss for encoding a coefficient between a first video frame and a second video frame. In additional examples, the quantization step may be determined block-by-block within the video frame.

Figure 17:
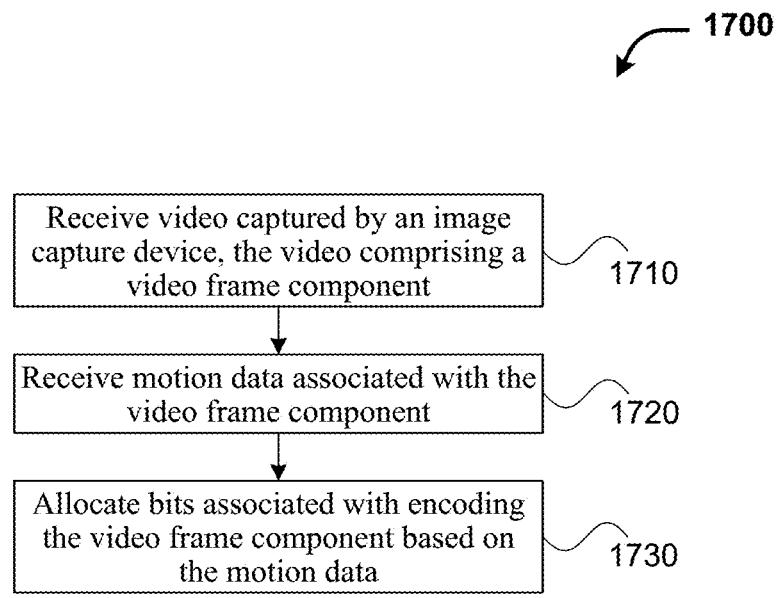
FIG. 17 is a flow chart illustrating a method of bit allocation for encoding video based on motion data, in accordance with embodiments of the invention.

FIG. 17 is a flow chart illustrating a method 1700 of bit allocation for encoding video based on motion data, in accordance with embodiments of the invention. At block 1710, video captured by an image capture device is received. The image capture device may be installed on a movable object. In particular, the image capture device may be installed on a UAV. Additionally, the video comprises a video frame component.

At block 1720, motion data associated with the video frame component is received. The motion data may include optical flow field data. Additionally, the motion data may indicate that the block has movement that exceeds a predetermined threshold. At block 1730, bits associated with encoding the video frame component are allocated based on the motion data. In examples, an amount of bit for encoding a block may be allocated so as to be commensurate with a block having movement that exceeds a predetermined threshold. In other examples, allocating bits may comprise choosing an amount of allocating bits, wherein a higher amount of allocating bits is chosen when the motion data indicates a higher degree of movement, relative to a lower amount of allocating bits that is chosen when the motion data indicates a lower degree of movement.

Figure 18:
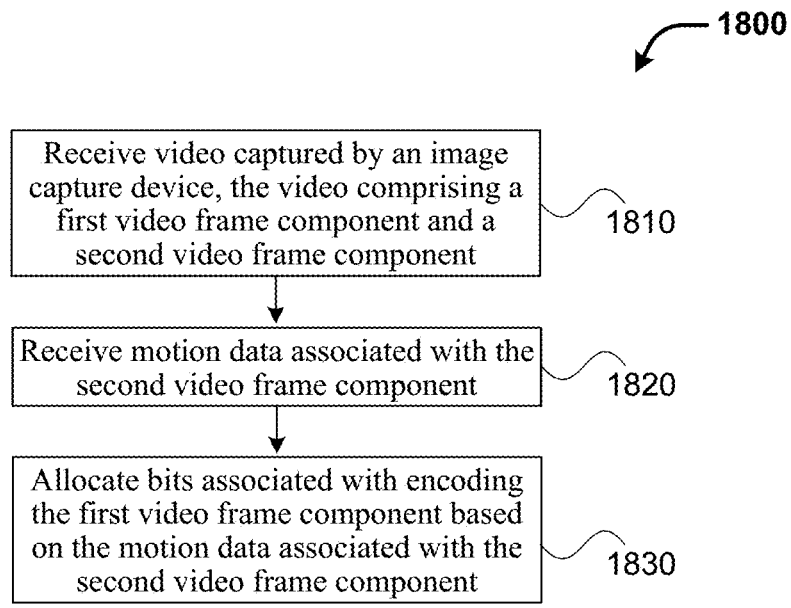
FIG. 18 is a flow chart illustrating another method of bit allocation for encoding video based on motion data, in accordance with embodiments of the invention.

FIG. 18 is a flow chart illustrating another method 1800 of bit allocation for encoding video based on motion data, in accordance with embodiments of the invention. At block 1810, video captured by an image capture device is received. The video comprises a first and second video frame component. In examples, the image capture device is a camera. In additional examples, the first video component may be a first video frame and the second video component may be a second video frame. Additionally, the first video frame may be adjacent in time to the second video frame. At block 1820, motion data associated with the second video frame component is received. In examples, the motion data may be obtained using one or more sensors. Additionally, at block 1830, bits associated with encoding the first video frame component are allocated based on the motion data associated with the second video frame component. In examples, bits may be allocated for encoding the first video frame to minimize loss for encoding a coefficient between the first video frame and the second video frame. In other examples, bits may be allocated for encoding the first block that minimizes loss for encoding the coefficient between the first block and the second block.

The systems, devices, and methods described herein for video encoding may apply to any video that is captured by a video capture device supported by a variety of objects. In particular, the video may be captured by a video capture device that is supported by an aerial vehicle. As previously mentioned, any description herein of an aerial vehicle, such as a UAV, may apply to and be used for any movable object. Any description herein of an aerial vehicle may apply specifically to UAVs. A movable object of the present invention may be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object may be a vehicle, such as a vehicle described elsewhere herein. In some embodiments, the movable object may be carried by a living subject, or take off from a living subject, such as a human or an animal. Suitable animals may include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object may be constrained with respect to one or more degrees of freedom, such as by a predetermined path, track, or orientation. The movement may be actuated by any suitable actuation mechanism, such as an engine or a motor. The actuation mechanism of the movable object may be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object may be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle may be self-propelled, such as self-propelled through the air. A self-propelled aerial vehicle may utilize a propulsion system, such as a propulsion system including one or more engines, motors, wheels, axles, magnets, rotors, propellers, blades, nozzles, or any suitable combination thereof. In some instances, the propulsion system may be used to enable the movable object to take off from a surface, land on a surface, maintain its current position and/or orientation (e.g., hover), change orientation, and/or change position.

The movable object may be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant on-board the movable object. The movable object may be controlled by a human or an autonomous control system (e.g., a computer control system), or any suitable combination thereof. The movable object may be an autonomous or semi-autonomous robot, such as a robot configured with an artificial intelligence.

The movable object may have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight may also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 19:
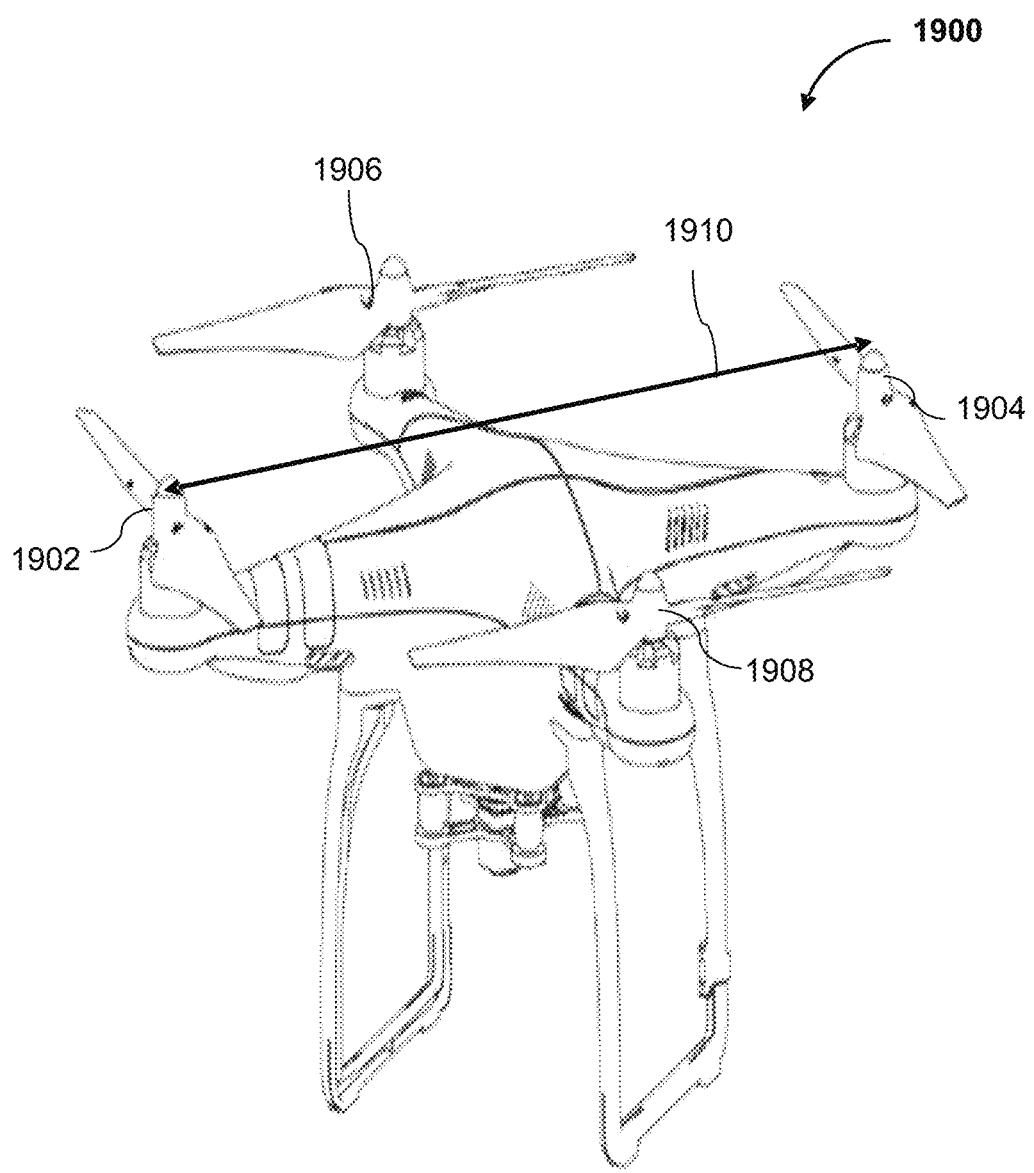
FIG. 19 illustrates an appearance of UAV in accordance with embodiments of the present invention.

FIG. 19 illustrates an unmanned aerial vehicle (UAV) 1900, in accordance with embodiments of the present invention. The UAV may be an example of a movable object as described herein. The UAV 1900 may include a propulsion system having four rotors 1902, 1904, 1906, and 1908. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors may be any suitable length 1910. For example, the length 1910 may be less than or equal to 2 m, or less than equal to 5 m. In some embodiments, the length 1910 may be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object may be configured to carry a load. The load may include one or more of passengers, cargo, equipment, instruments, and the like. The load may be provided within a housing. The housing may be separate from a housing of the movable object, or be part of a housing for a movable object. Alternatively, the load may be provided with a housing while the movable object does not have a housing. Alternatively, portions of the load or the entire load may be provided without a housing. The load may be rigidly fixed relative to the movable object. Optionally, the load may be movable relative to the movable object (e.g., translatable or rotatable relative to the movable object). The load may include a payload and/or a carrier, as described elsewhere herein.

In some embodiments, the movement of the movable object, carrier, and payload relative to a fixed reference frame (e.g., the surrounding environment) and/or to each other, may be controlled by a terminal. The terminal may be a remote control device at a location distant from the movable object, carrier, and/or payload. The terminal may be disposed on or affixed to a support platform. Alternatively, the terminal may be a handheld or wearable device. For example, the terminal may include a smartphone, tablet, laptop, computer, glasses, gloves, helmet, microphone, or suitable combinations thereof. The terminal may include a user interface, such as a keyboard, mouse, joystick, touchscreen, or display. Any suitable user input may be used to interact with the terminal, such as manually entered commands, voice control, gesture control, or position control (e.g., via a movement, location or tilt of the terminal).

The terminal may be used to control any suitable state of the movable object, carrier, and/or payload. For example, the terminal may be used to control the position and/or orientation of the movable object, carrier, and/or payload relative to a fixed reference from and/or to each other. In some embodiments, the terminal may be used to control individual elements of the movable object, carrier, and/or payload, such as the actuation assembly of the carrier, a sensor of the payload, or an emitter of the payload. The terminal may include a wireless communication device adapted to communicate with one or more of the movable object, carrier, or payload.

The terminal may include a suitable display unit for viewing information of the movable object, carrier, and/or payload. For example, the terminal may be configured to display information of the movable object, carrier, and/or payload with respect to position, translational velocity, translational acceleration, orientation, angular velocity, angular acceleration, or any suitable combinations thereof. In some embodiments, the terminal may display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 20:
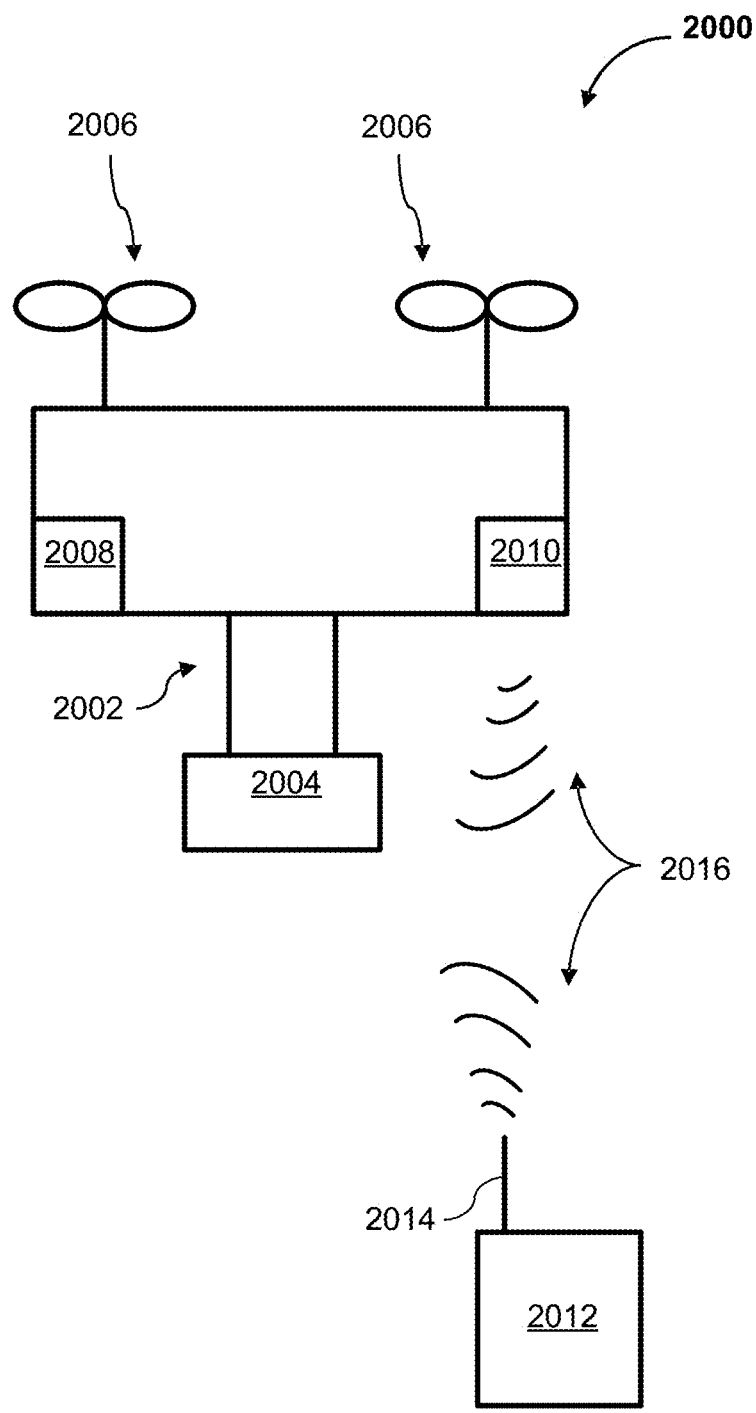
FIG. 20 illustrates a movable object including a carrier and a payload, in accordance with embodiments of the present invention.

FIG. 20 illustrates a movable object 2000 including a carrier 2002 and a payload 2004, in accordance with embodiments. Although the movable object 2000 is depicted as an aircraft, this depiction is not intended to be limiting, and any suitable type of movable object may be used, as previously described herein. One of skill in the art would appreciate that any of the embodiments described herein in the context of aircraft systems may be applied to any suitable movable object (e.g., an UAV). In some instances, the payload 2004 may be provided on the movable object 2000 without requiring the carrier 2002. The movable object 2000 may include propulsion mechanisms 2006, a sensing system 2008, and a communication system 2010.

The propulsion mechanisms 2006 may include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms may be different types of propulsion mechanisms. The propulsion mechanisms 2006 may be mounted on the movable object 2000 using any suitable means, such as a support element (e.g., a drive shaft) as described elsewhere herein. The propulsion mechanisms 2006 may be mounted on any suitable portion of the movable object 2000, such on the top, bottom, front, back, sides, or suitable combinations thereof.

In some embodiments, the propulsion mechanisms 2006 may enable the movable object 2000 to take off vertically from a surface or land vertically on a surface without requiring any horizontal movement of the movable object 2000 (e.g., without traveling down a runway). Optionally, the propulsion mechanisms 2006 may be operable to permit the movable object 2000 to hover in the air at a specified position and/or orientation. One or more of the propulsion mechanisms 2000 may be controlled independently of the other propulsion mechanisms. Alternatively, the propulsion mechanisms 2000 may be configured to be controlled simultaneously. For example, the movable object 2000 may have multiple horizontally oriented rotors that may provide lift and/or thrust to the movable object. The multiple horizontally oriented rotors may be actuated to provide vertical takeoff, vertical landing, and hovering capabilities to the movable object 2000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors may be varied independently in order to control the lift and/or thrust produced by each rotor, and thereby adjust the spatial disposition, velocity, and/or acceleration of the movable object 2000 (e.g., with respect to up to three degrees of translation and up to three degrees of rotation).

The sensing system 2008 may include one or more sensors that may sense the spatial disposition, velocity, and/or acceleration of the movable object 2000 (e.g., with respect to up to three degrees of translation and up to three degrees of rotation). The one or more sensors may include global positioning system (GPS) sensors, motion sensors, inertial sensors, proximity sensors, or image sensors. The sensing data provided by the sensing system 2008 may be used to control the spatial disposition, velocity, and/or orientation of the movable object 2000 (e.g., using a suitable processing unit and/or control module, as described below). Alternatively, the sensing system 2008 may be used to provide data regarding the environment surrounding the movable object, such as weather conditions, proximity to potential obstacles, location of geographical features, location of manmade structures, and the like.

The communication system 2010 enables communication with terminal 2012 having a communication system 2014 via wireless signals 2016. The communication systems 2010, 2014 may include any number of transmitters, receivers, and/or transceivers suitable for wireless communication. The communication may be one-way communication, such that data may be transmitted in only one direction. For example, one-way communication may involve only the movable object 2000 transmitting data to the terminal 2012, or vice-versa. The data may be transmitted from one or more transmitters of the communication system 2010 to one or more receivers of the communication system 2012, or vice-versa. Alternatively, the communication may be two-way communication, such that data may be transmitted in both directions between the movable object 2000 and the terminal 2012. The two-way communication may involve transmitting data from one or more transmitters of the communication system 2010 to one or more receivers of the communication system 2014, and vice-versa.

In some embodiments, the terminal 2012 may provide control data to one or more of the movable object 2000, carrier 2002, and payload 2004 and receive information from one or more of the movable object 2000, carrier 2002, and payload 2004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 2006), or a movement of the payload with respect to the movable object (e.g., via control of the carrier 2002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 2008 or of the payload 2004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 2012 may be configured to control a state of one or more of the movable object 2000, carrier 2002, or payload 2004. Alternatively or in combination, the carrier 2002 and payload 2004 may also each include a communication module configured to communicate with terminal 2012, such that the terminal may communicate with and control each of the movable object 2000, carrier 2002, and payload 2004 independently.

In some embodiments, the movable object 2000 may be configured to communicate with another remote device in addition to the terminal 2012, or instead of the terminal 2012. The terminal 2012 may also be configured to communicate with another remote device as well as the movable object 2000. For example, the movable object 2000 and/or terminal 2012 may communicate with another movable object, or a carrier or payload of another movable object. When desired, the remote device may be a second terminal or other computing device (e.g., computer, laptop, tablet, smartphone, or other mobile device). The remote device may be configured to transmit data to the movable object 2000, receive data from the movable object 2000, transmit data to the terminal 2012, and/or receive data from the terminal 2012. Optionally, the remote device may be connected to the Internet or other telecommunications network, such that data received from the movable object 2000 and/or terminal 2012 may be uploaded to a website or server.

Figure 21:
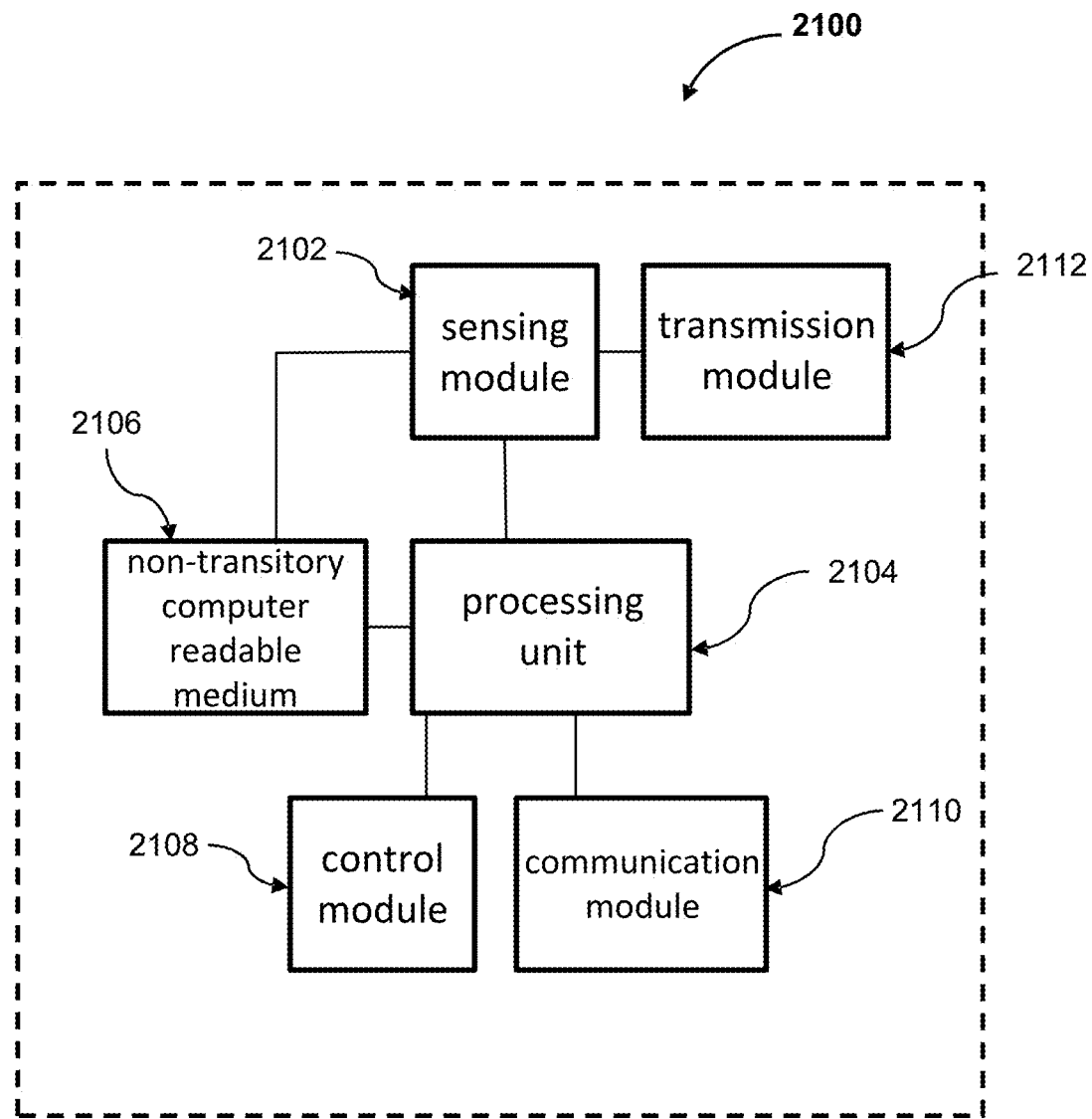
FIG. 21 is a schematic illustration by way of block diagram of a system for controlling a movable object, in accordance with embodiments of the present invention.

FIG. 21 is a schematic illustration by way of block diagram of a system 2100 for controlling a movable object, in accordance with embodiments. The system 2100 may be used in combination with any suitable embodiment of the systems, devices, and methods disclosed herein. The system 2100 may include a sensing module 2102, processing unit 2104, non-transitory computer readable medium 2106, control module 2108, and communication module 2110.

The sensing module 2102 may utilize different types of sensors that collect information relating to the movable objects in different ways. Different types of sensors may sense different types of signals or signals from different sources. For example, the sensors may include inertial sensors, GPS sensors, proximity sensors (e.g., lidar), or vision/image sensors (e.g., a camera). The sensing module 2102 may be operatively coupled to a processing unit 2104 having a plurality of processors. In some embodiments, the sensing module may be operatively coupled to a transmission module 2112 (e.g., a Wi-Fi image transmission module) configured to directly transmit sensing data to a suitable external device or system. For example, the transmission module 2112 may be used to transmit images captured by a camera of the sensing module 2102 to a remote terminal.

The processing unit 2104 may have one or more processors, such as a programmable processor (e.g., a central processing unit (CPU)). The processing unit 2104 may be operatively coupled to a non-transitory computer readable medium 2106. The non-transitory computer readable medium 2106 may store logic, code, and/or program instructions executable by the processing unit 2104 for performing one or more steps. The non-transitory computer readable medium may include one or more memory units (e.g., removable media or external storage such as an SD card or random access memory (RAM)). In some embodiments, data from the sensing module 2102 may be directly conveyed to and stored within the memory units of the non-transitory computer readable medium 2106. The memory units of the non-transitory computer readable medium 2106 may store logic, code and/or program instructions executable by the processing unit 2104 to perform any suitable embodiment of the methods described herein. For example, the processing unit 2104 may be configured to execute instructions causing one or more processors of the processing unit 2104 to analyze sensing data produced by the sensing module. The memory units may store sensing data from the sensing module to be processed by the processing unit 2104. In some embodiments, the memory units of the non-transitory computer readable medium 2106 may be used to store the processing results produced by the processing unit 2104.

In some embodiments, the processing unit 2104 may be operatively coupled to a control module 2108 configured to control a state of the movable object. For example, the control module 2108 may be configured to control the propulsion mechanisms of the movable object to adjust the spatial disposition, velocity, and/or acceleration of the movable object with respect to six degrees of freedom. Alternatively or in combination, the control module 2108 may control one or more of a state of a carrier, payload, or sensing module.

The processing unit 2104 may be operatively coupled to a communication module 2110 configured to transmit and/or receive data from one or more external devices (e.g., a terminal, display device, or other remote controller). Any suitable means of communication may be used, such as wired communication or wireless communication. For example, the communication module 2110 may utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, may be used. Wireless communications may be proximity dependent or proximity independent. In some embodiments, line-of-sight may or may not be required for communications. The communication module 2110 may transmit and/or receive one or more of sensing data from the sensing module 2102, processing results produced by the processing unit 2104, predetermined control data, user commands from a terminal or remote controller, and the like.

The components of the system 2100 may be arranged in any suitable configuration. For example, one or more of the components of the system 2100 may be located on the movable object, carrier, payload, terminal, sensing system, or an additional external device in communication with one or more of the above. Additionally, although FIG. 21 depicts a single processing unit 2104 and a single non-transitory computer readable medium 2106, one of skill in the art would appreciate that this is not intended to be limiting, and that the system 2100 may include a plurality of processing units and/or non-transitory computer readable media. In some embodiments, one or more of the plurality of processing units and/or non-transitory computer readable media may be situated at different locations, such as on the movable object, carrier, payload, terminal, sensing module, additional external device in communication with one or more of the above, or suitable combinations thereof, such that any suitable aspect of the processing and/or memory functions performed by the system 2100 may occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of determining a quantization step for encoding video based on sensor data, said method comprising:
   receiving video captured by an image capture device configured on an unmanned aerial vehicle (UAV), the video comprising a video frame component;
   receiving sensor data obtained from one or more sensors configured off-board a gimbal configured on the UAV, the gimbal carrying the image capturing device, the sensor data indicating a degree of movement in motion associated with the video frame component;
   allocating bits to at least one portion of the video frame component based on the sensor data received from the one or more sensors configured off-board the UAV, including:
      in response to the sensor data indicating a first degree of movement, allocating a first amount of bits to the at least one portion of the video frame component; and
      in response to the sensor data indicating a second degree of movement, allocating a second amount of bits to the at least one portion of the video frame component, the second amount being more than the first amount, and the second degree being higher than the first degree; and
   determining a quantization step for encoding the video frame component according to the degree of movement indicated by the sensor data from the one or more sensors configured off-board the gimbal;
   wherein:
      the video frame component is a first video frame, and the video further includes a second video frame component; and
      the method further includes: choosing a first quantization step for encoding the first video frame when the first video frame has the degree of movement that exceeds a first threshold degree of movement, and choosing a second quantization step for encoding the second video frame when the second video frame has the degree of movement that falls below a second threshold degree of movement.

2. The method of claim 1, wherein the step of capturing the video occurs while the UAV is in flight.

3. The method of claim 1, further comprising: generating optical flow field data based on the sensor data from the sensor configured off-board the gimbal.

4. The method of claim 3, wherein the optical flow field data is generated with aid of an optical flow field generator configured off-board the UAV and in communication with the UAV.

5. The method of claim 4, wherein (1) the optical flow field data is generated, or (2) the quantization step for encoding the video frame component is determined, while the UAV is in flight.

6. The method of claim 1, wherein the quantization step is determined such that a higher level of quantization corresponds to a greater degree of movement indicated by the sensor data, and the method further includes encoding the video frame component based on the determined quantization step for encoding the video frame component.

7. A non-transitory computer readable medium containing program instructions for determining a quantization step for encoding video based on sensor data, said computer readable medium comprising:
   program instructions for receiving video captured by an image capture device configured on an unmanned aerial vehicle (UAV), the video comprising a video frame component;
   program instructions for receiving sensor data obtained from one or more sensors configured off-board the UAV, the sensor data indicating a degree of movement in motion associated with the video frame component;
   program instructions for allocating bits to at least one portion of the video frame component based on the sensor data received from the one or more sensors configured off-board a gimbal configured on the UAV and carrying the image capture device, including:
      in response to the sensor data indicating a first degree of movement, allocating a first amount of bits to the at least one portion of the video frame component; and
      in response to the sensor data indicating a second degree of movement, allocating a second amount of bits to the at least one portion of the video frame component, the second amount being more than the first amount, and the second degree being higher than the first degree; and
   program instructions for determining a quantization step for encoding the video frame component according to the degree of movement indicated by the sensor data from the one or more sensors configured off-board the gimbal the UAV;
   wherein:
      the video frame component is a first video frame, and the video further includes a second video frame component; and the computer readable medium further comprises program instructions for: choosing a first quantization step for encoding the first video frame when the first video frame has the degree of movement that exceeds a first threshold degree of movement, and choosing a second quantization step for encoding the second video frame when the second video frame has the degree of movement that falls below a second threshold degree of movement.

8. The non-transitory computer readable medium of claim 7, wherein the program instructions for receiving the video are executed while the UAV is in flight.

9. The non-transitory computer readable medium of claim 8, wherein the program instructions for determining the quantization step for encoding the video frame component according to the degree of movement are executed while the UAV is in flight.

10. The non-transitory computer readable medium of claim 7, wherein the sensor data is further used to generate optical flow field data that demonstrates how light flows within the video frame component.

11. The non-transitory computer readable medium of claim 7, wherein the quantization step is determined such that a higher level of quantization corresponds to a greater degree of movement indicated by the sensor data.

12. The non-transitory computer readable medium of claim 7, wherein the quantization step is determined such that a lower level of quantization is selected when the sensor data indicates the degree of movement that falls below a threshold degree of movement.

13. The non-transitory computer readable medium of claim 7, further comprising program instructions for encoding the video frame component based on the determined quantization step for encoding the video frame component.

14. A system for determining a quantization step for encoding video based on sensor data, said system comprising:
an image capture device configured on an unmanned aerial vehicle (UAV), the image capture device configured to capture a video; and
one or more processors, individually or collectively configured to:
receive the video captured by the image capture device, the video comprising a video frame component;
receive sensor data obtained from one or more sensors configured off-board a gimbal configured the UAV and carrying the image capture device, the sensor data indicating a degree of movement in motion associated with the video frame component;
allocate bits to at least one portion of the video frame component based on sensor data received from the one or more sensors configured off-board the UAV, including:
in response to the sensor data indicating a first degree of movement, allocating a first amount of bits to the at least one portion of the video frame component; and
in response to the sensor data indicating a second degree of movement, allocating a second amount of bits to the at least one portion of the video frame component, the second amount being more than the first amount, and the second degree being higher than the first degree; and
determine a quantization step for encoding the video frame component according to the degree of movement indicated by the sensor data from the one or more sensors configured off-board the gimbal;
wherein:
the video frame component is a first video frame, and the video further includes a second video frame component; and
the processors are further configured to: choose a first quantization step for encoding the first video frame when the first video frame has the degree of movement that exceeds a first threshold degree of movement, and choose a second quantization step for encoding the second video frame when the second video frame has the degree of movement that falls below a second threshold degree of movement.

15. The system of claim 14, wherein:
the one or more sensors include one or more of the following: optical sensor, ultrasonic sensor, MVO, gyroscope, GPS, or altimeter.

16. The system of claim 15, wherein the one or more processors are on-board the UAV.

17. The method of claim 1, further comprising:
after allocating bits to the at least one portion of the video frame component based on the degree of the movement, assigning a first amount of the allocated bits to calculating a coefficient and assigning a second amount of the allocated bits to identifying a motion vector, wherein the first amount is greater than the second amount if the degree of movement exceeds a threshold.

* * * * *